(12) United States Patent
Yamamoto et al.

(10) Patent No.: US 9,021,001 B2
(45) Date of Patent: Apr. 28, 2015

(54) INDIVIDUAL-SPECIFIC INFORMATION GENERATION APPARATUS AND INDIVIDUAL-SPECIFIC INFORMATION GENERATION METHOD

(71) Applicant: Fujitsu Limited, Kawasaki-shi, Kanagawa (JP)

(72) Inventors: Dai Yamamoto, Kawasaki (JP); Masahiko Takenaka, Kawasaki (JP); Kouichi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 13/728,097

(22) Filed: Dec. 27, 2012

(65) Prior Publication Data

US 2013/0138710 A1 May 30, 2013

Related U.S. Application Data

(63) Continuation of application No. PCT/JP2010/061211, filed on Jun. 30, 2010.

(51) Int. Cl.
*G06F 7/58* (2006.01)
*H04L 9/32* (2006.01)
*H04L 9/08* (2006.01)

(52) U.S. Cl.
CPC .............. *G06F 7/582* (2013.01); *H04L 9/0869* (2013.01); *H04L 9/0866* (2013.01); *H04L 9/3278* (2013.01)

(58) Field of Classification Search
CPC ..... G06F 7/582; H04L 9/0866; H04L 9/0869; H04L 9/3278
USPC ................................................. 708/250–256
See application file for complete search history.

(56) References Cited

U.S. PATENT DOCUMENTS

2003/0061250 A1    3/2003  Fujita et al.
2008/0141364 A1*   6/2008  Skoric et al. ............... 726/20
(Continued)

FOREIGN PATENT DOCUMENTS

JP         3604674         10/2004
JP       2009-517910        4/2009
WO    WO 2008/056612 A1    5/2008

OTHER PUBLICATIONS

International Preliminary Report on Patentability mailed Feb. 21, 2013 in corresponding International Application No. PCT/JP2010/061211.

(Continued)

*Primary Examiner* — Tan V. Mai
(74) *Attorney, Agent, or Firm* — Staas & Halsey LLP

(57) ABSTRACT

The generation of individual-specific information having a good reliability and uniqueness is made possible with a little circuit scale. For this purpose, in an individual-specific information generation apparatus, a plurality of digital circuits are in the same circuit configuration. Each of the digital circuits outputs a fixed or a random number output value individually without their output with respect to a certain input being determined unambiguously among the digital circuits. In each of the digital circuit, an order is defined in advance. A random number judgment unit judges whether the output value is a random value or fixed, for each of the plurality of digital circuits. An individual-specific information generation unit generates the individual-specific information based on information of the order defined in the digital circuit judged by the random number judgment unit as having a fixed output value among the plurality of digital circuits and the output value.

16 Claims, 31 Drawing Sheets

(56) References Cited

U.S. PATENT DOCUMENTS

| | | | |
|---|---|---|---|
| 2008/0170695 A1* | 7/2008 | Adler et al. | 380/277 |
| 2009/0132624 A1* | 5/2009 | Haselsteiner et al. | 708/255 |
| 2009/0217045 A1 | 8/2009 | Skoric et al. | |
| 2009/0271860 A1 | 10/2009 | Nonaka et al. | |
| 2010/0031065 A1 | 2/2010 | Futa et al. | |
| 2011/0066670 A1* | 3/2011 | Yu | 708/252 |

OTHER PUBLICATIONS

International Search Report mailed Aug. 3, 2010 in corresponding PCT Application No. PCT/JP2010/061211.

Jae W. Lee et al, "A Technique to build a Secret Key in Integrated Circuits for Identification and Authentication Applications", IEEE VLSI Circuits Symposium, Jun. 2004.

Sandeep S. Kumar, et al., "Extend Abstract: The Butterfly PUF Protecting IP on every FPGA", IEEE International Workshop on Hardware-Oriented Security and Trust-HOST, 2008.

G. Edward Suh et al., "Physical Unclonable Functions for Device Authentication and Secret Key Generation", Design Automation Conference, Jun. 2007.

Eric Simpson, "Runtime Intellectual Property Protection on Programmable Platforms", Virginia Polytechnic Institute and State University, Apr. 30, 2007, pp. 9-12.

Mehrdad Majzoobi et al, "Lightweight Secure PUFs", Proceedings of the 2008 IEEE/ACM International Conference on Computer-Aided Design, Nov. 2008, pp. 670-673.

* cited by examiner

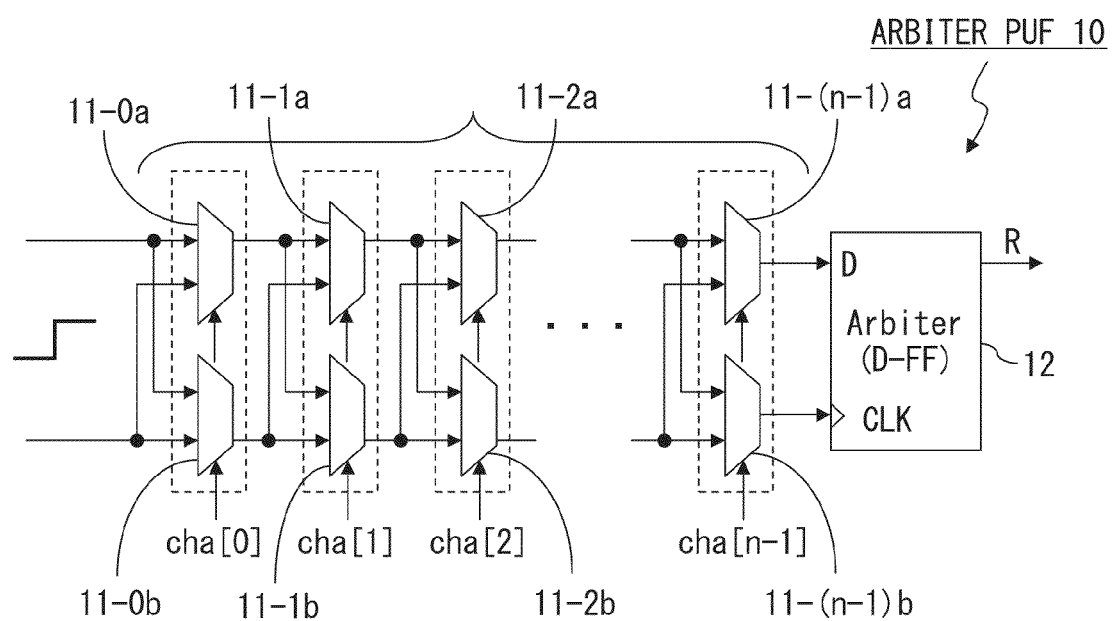
F I G. 1

| S | R | Q | $\overline{Q}$ |
|---|---|---|---|
| 0 | 0 | Q | $\overline{Q}$ |
| 0 | 1 | 0 | 1 |
| 1 | 0 | 1 | 0 |
| 1 | 1 | 1 | 1 |

INHIBIT INPUT (applies to last row)

F I G. 2 B

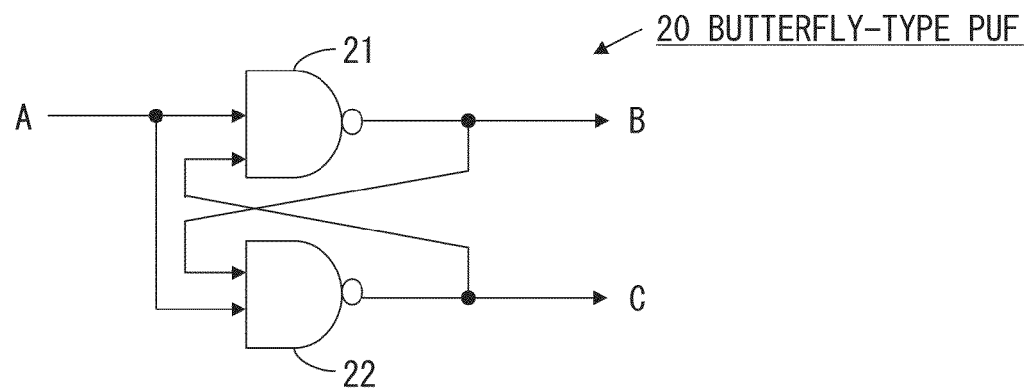
F I G. 3

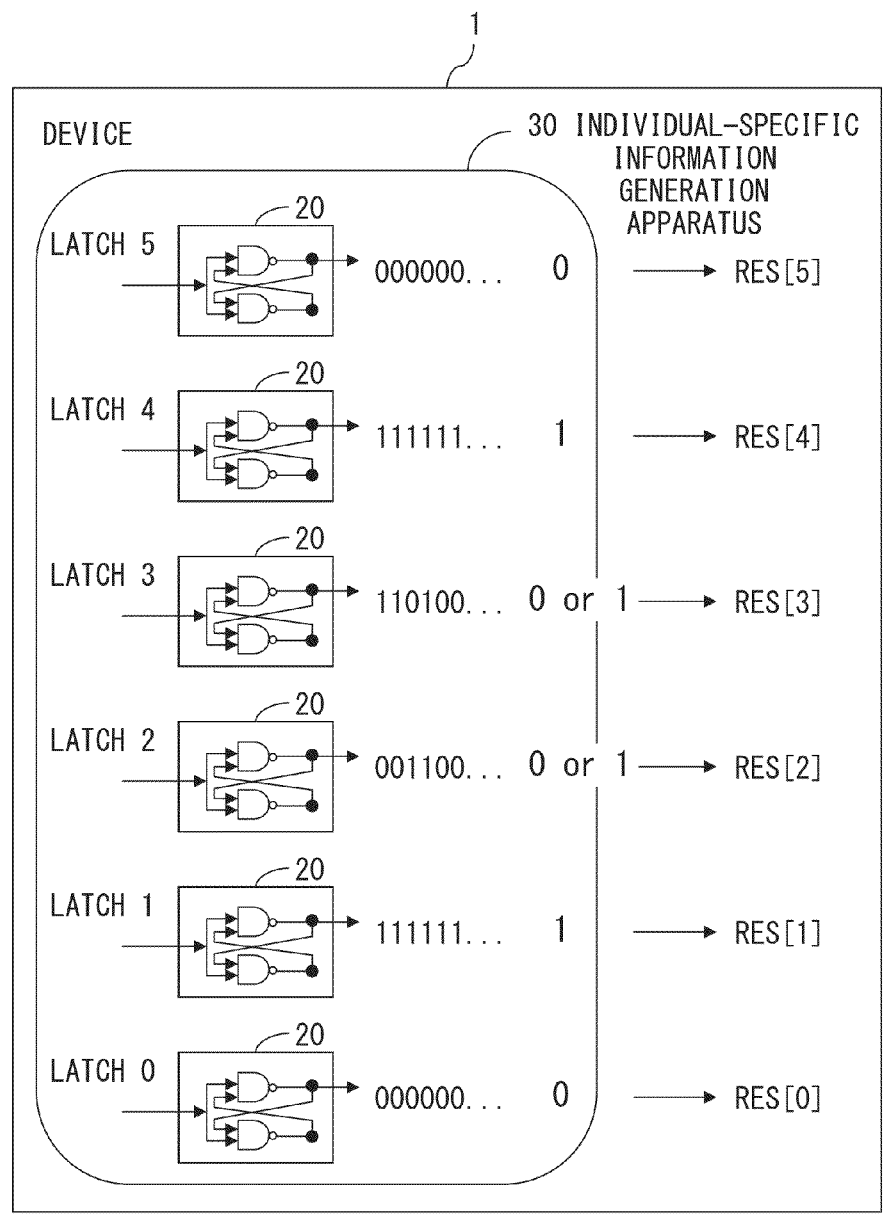
F I G. 4

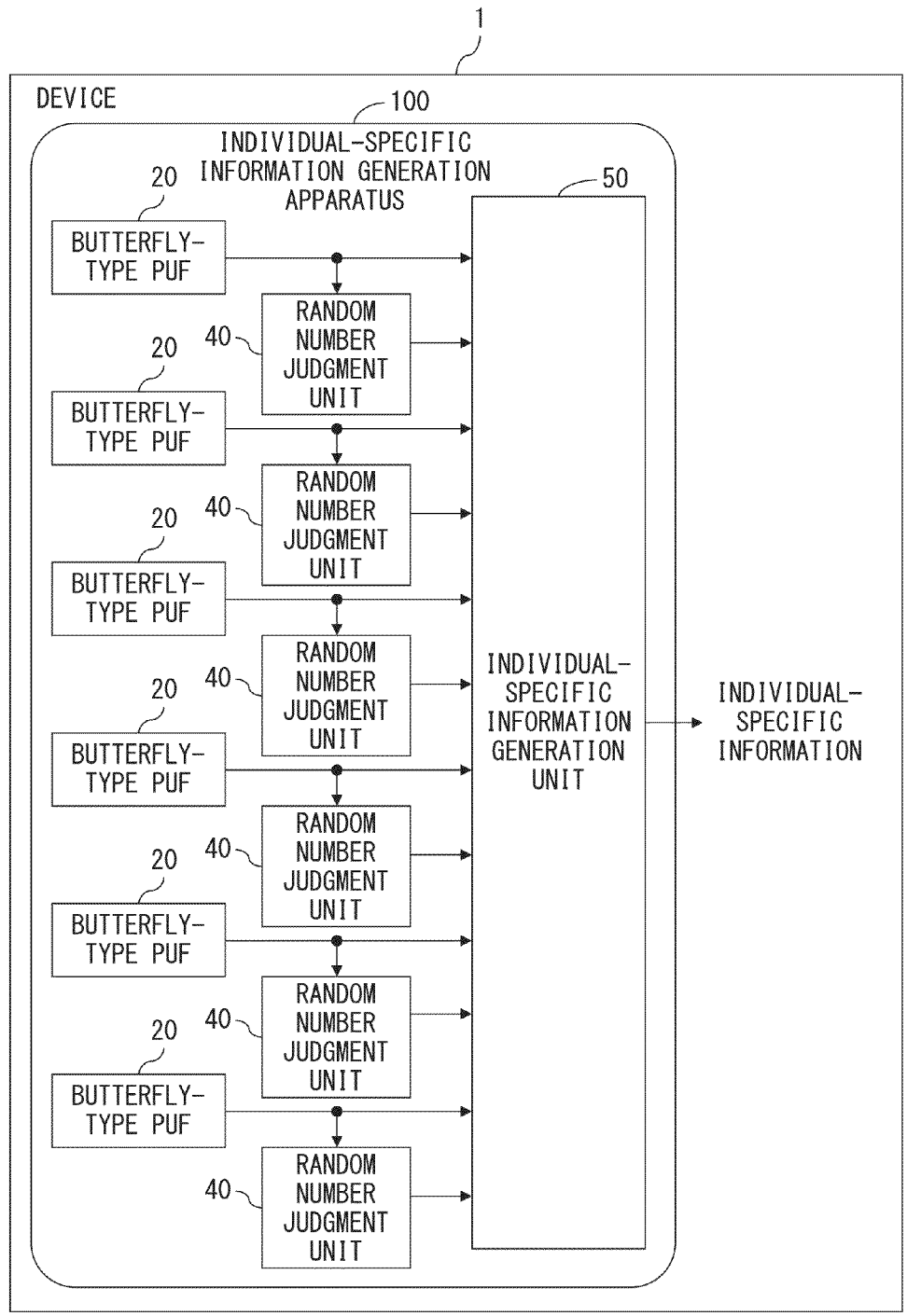
F I G. 5

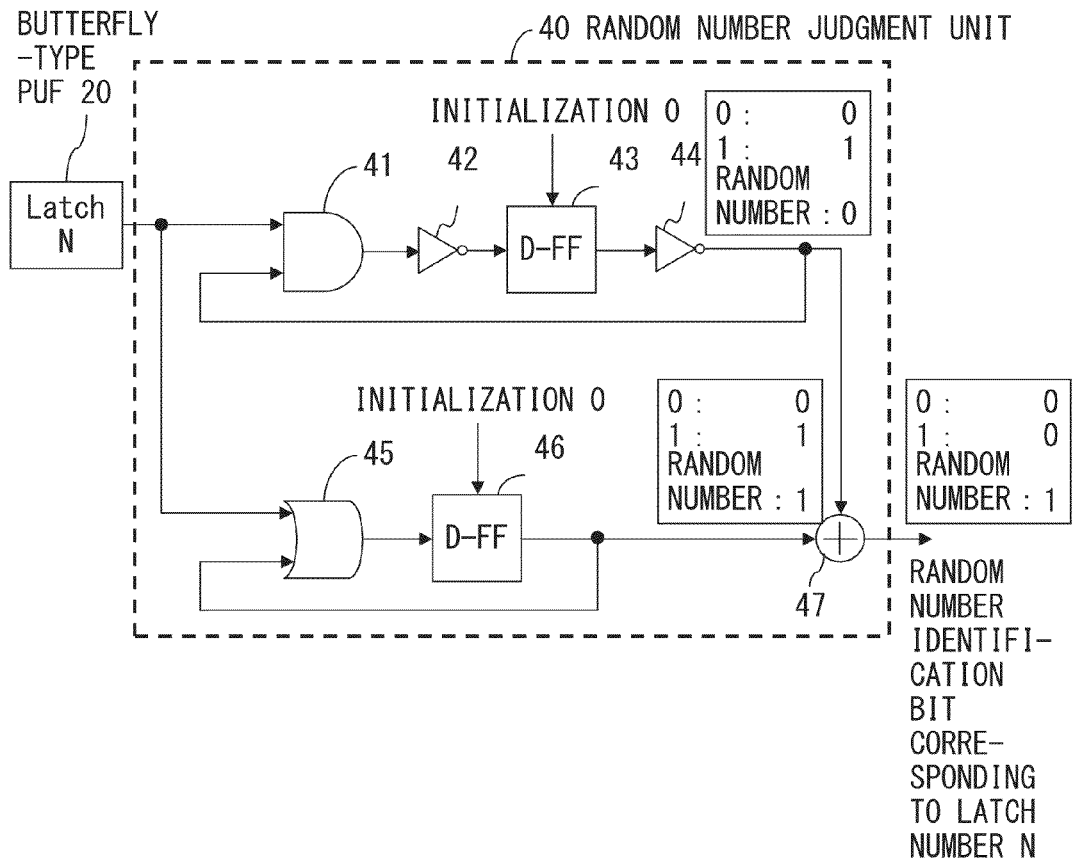
F I G. 6

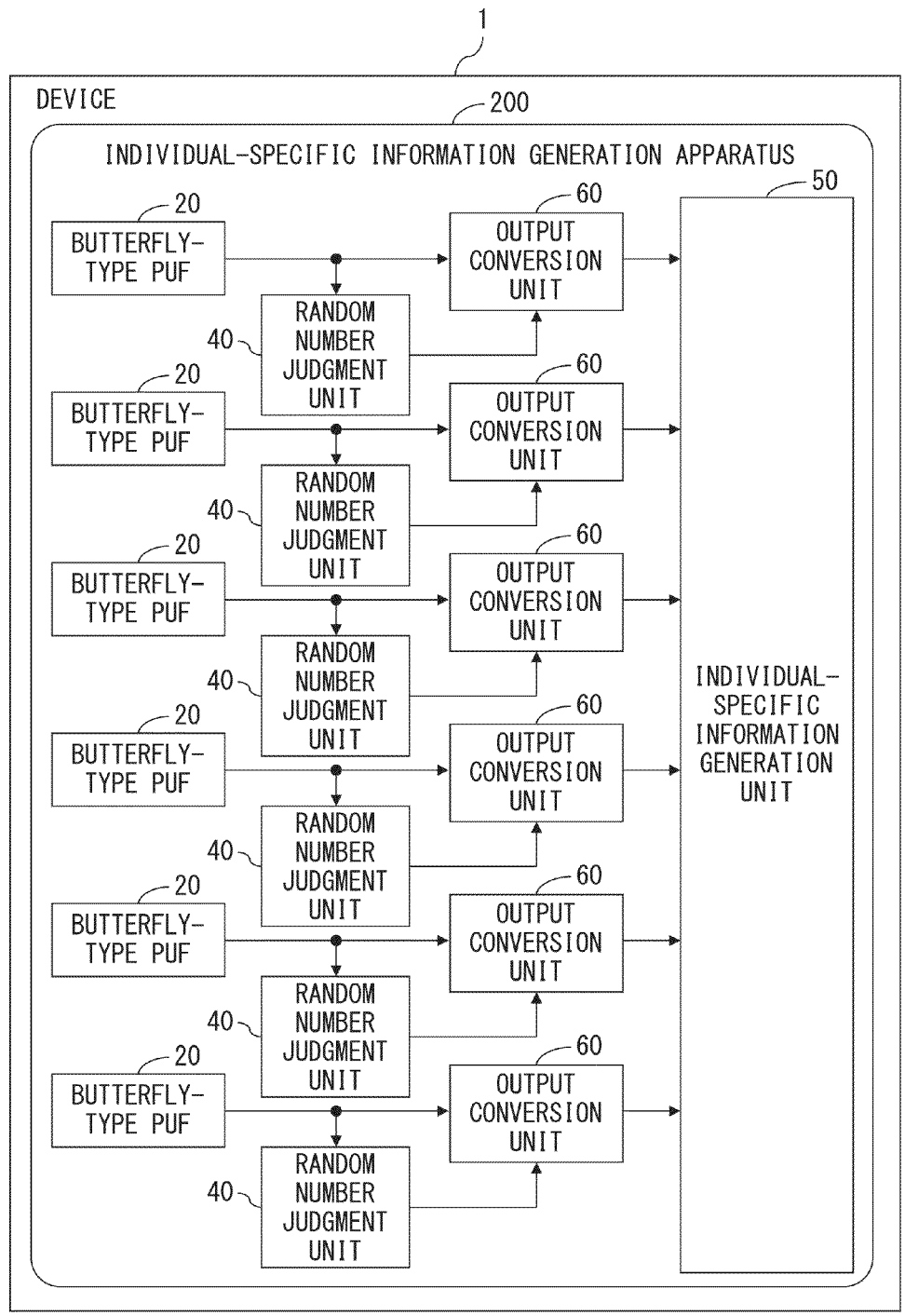
F I G. 8

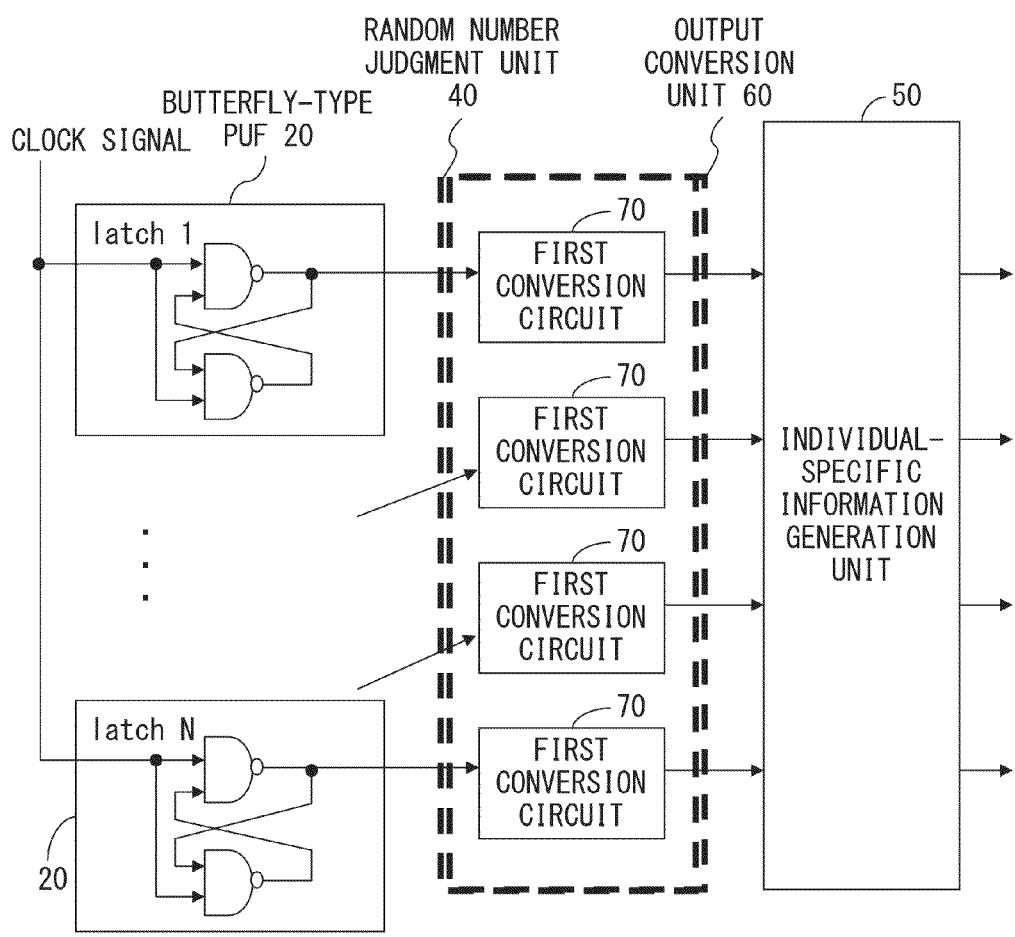
F I G. 10

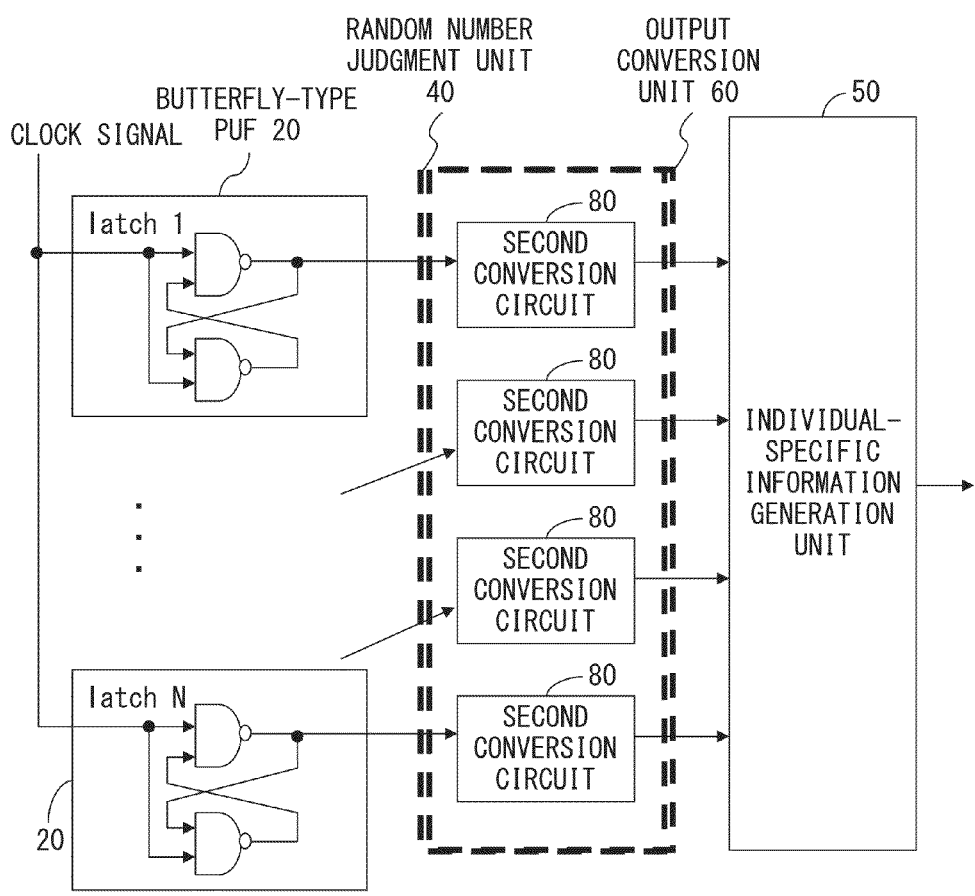
F I G. 1 2

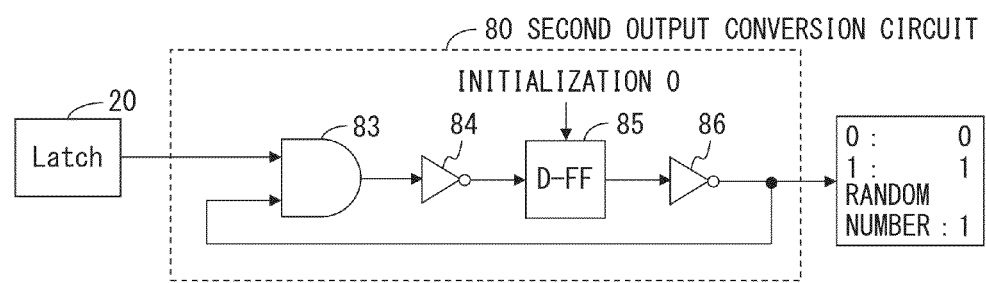
F I G. 1 3 B

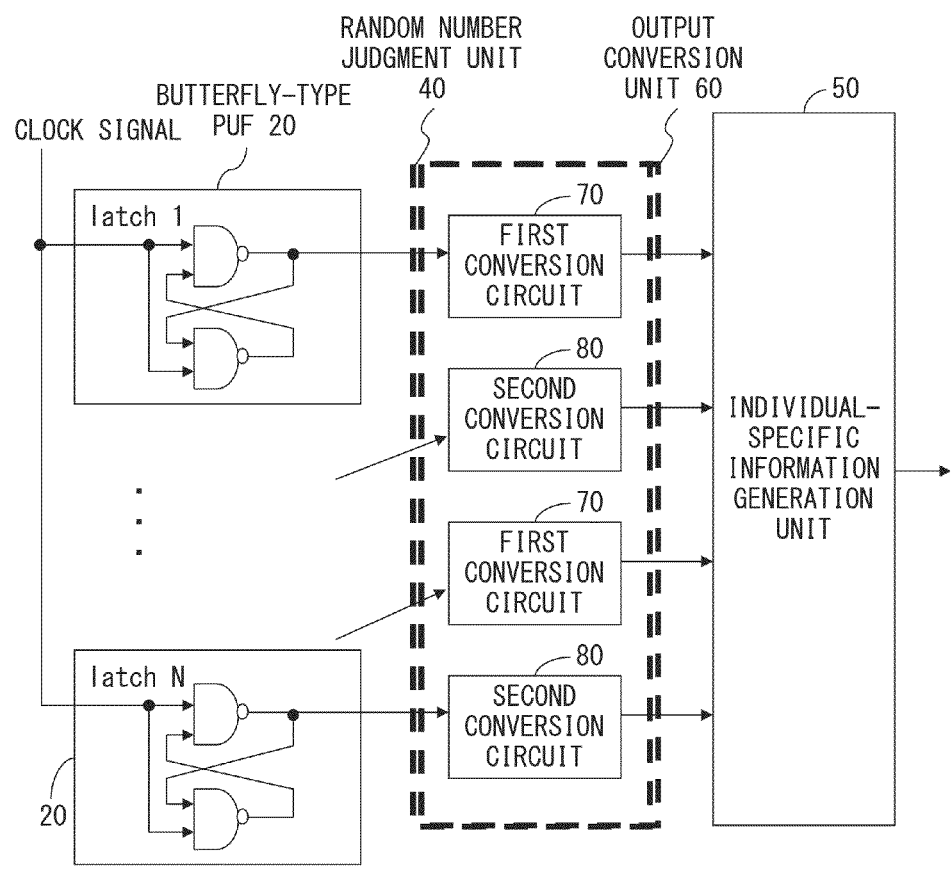
F I G. 1 4

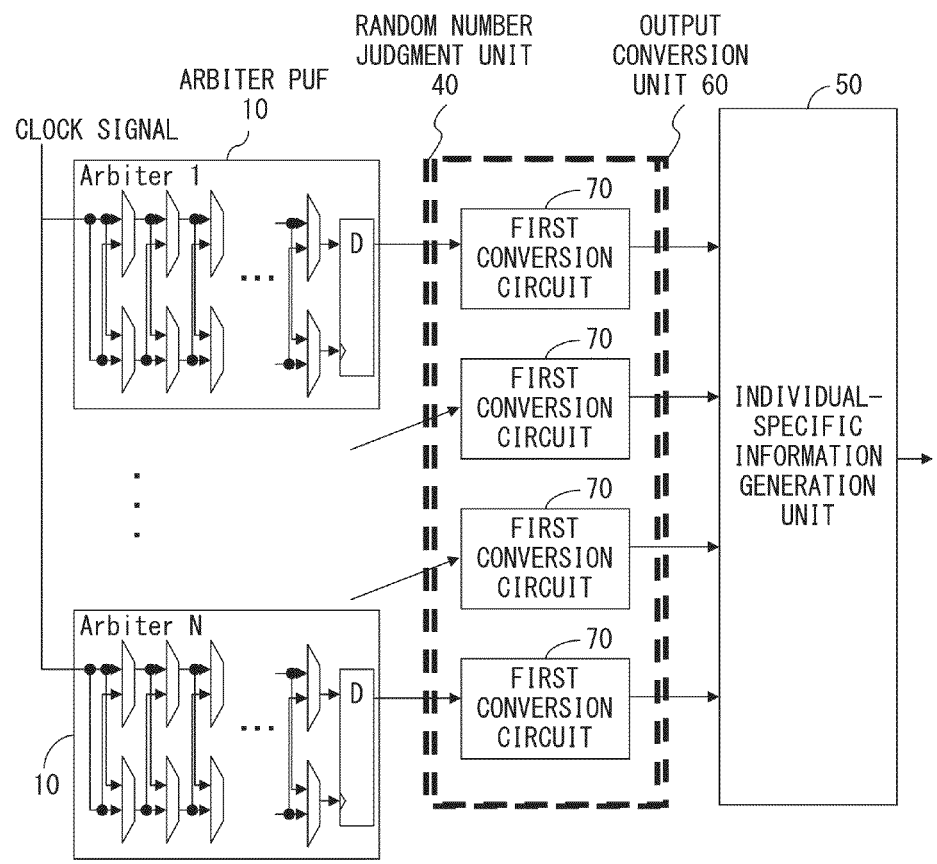
F I G. 15

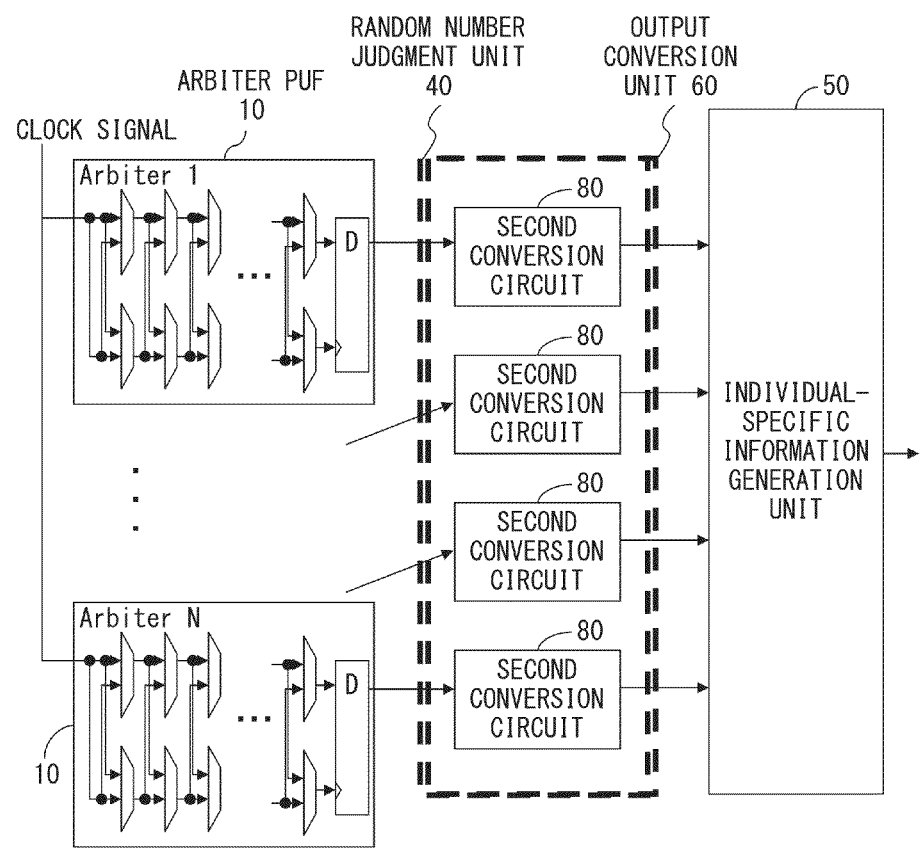
F I G. 16

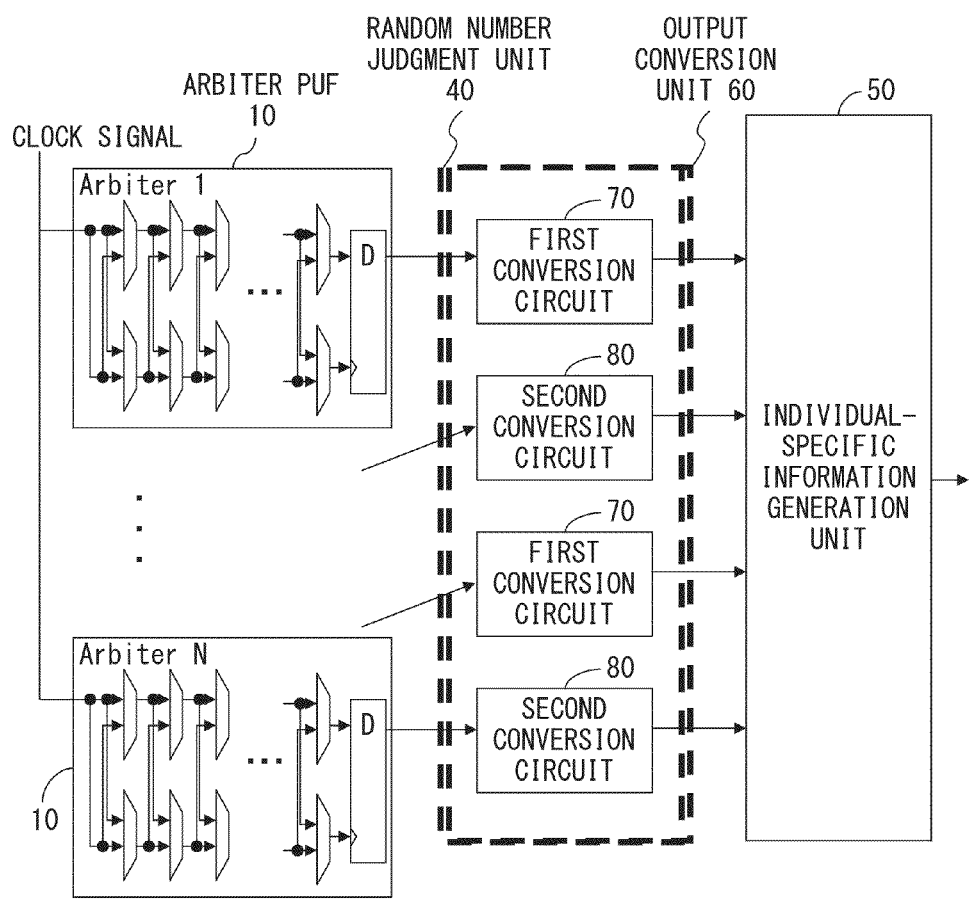
F I G. 17

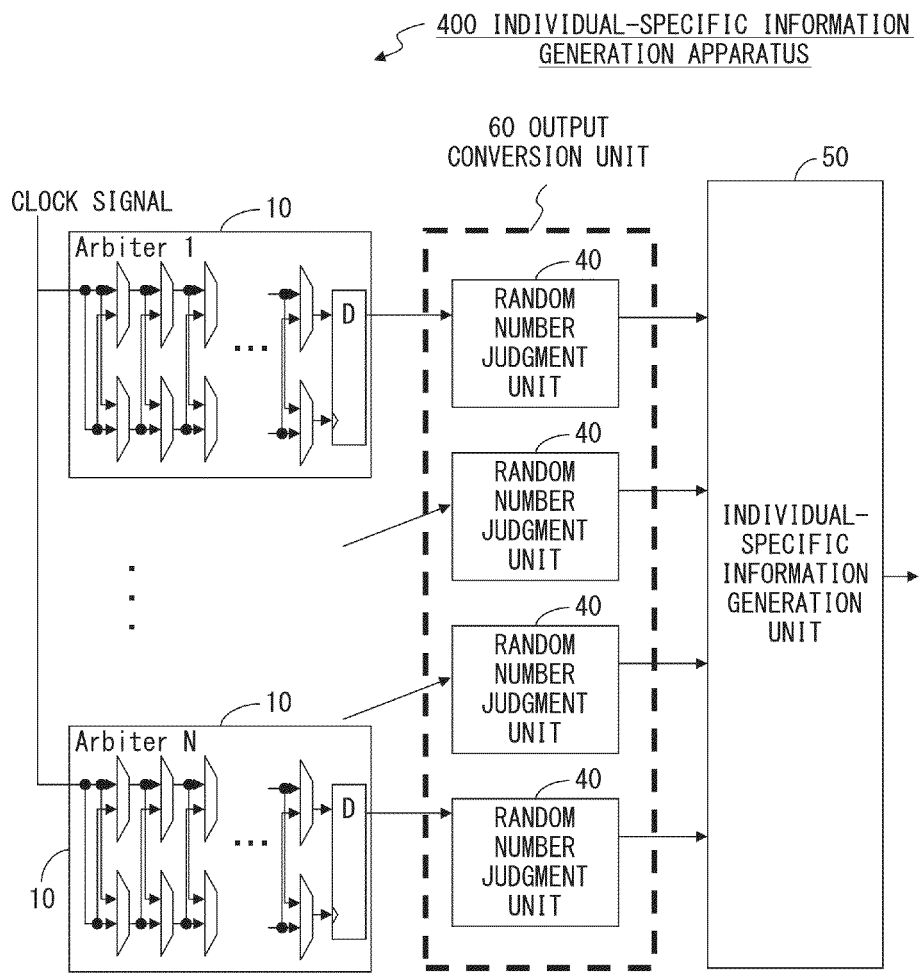
F I G. 2 4

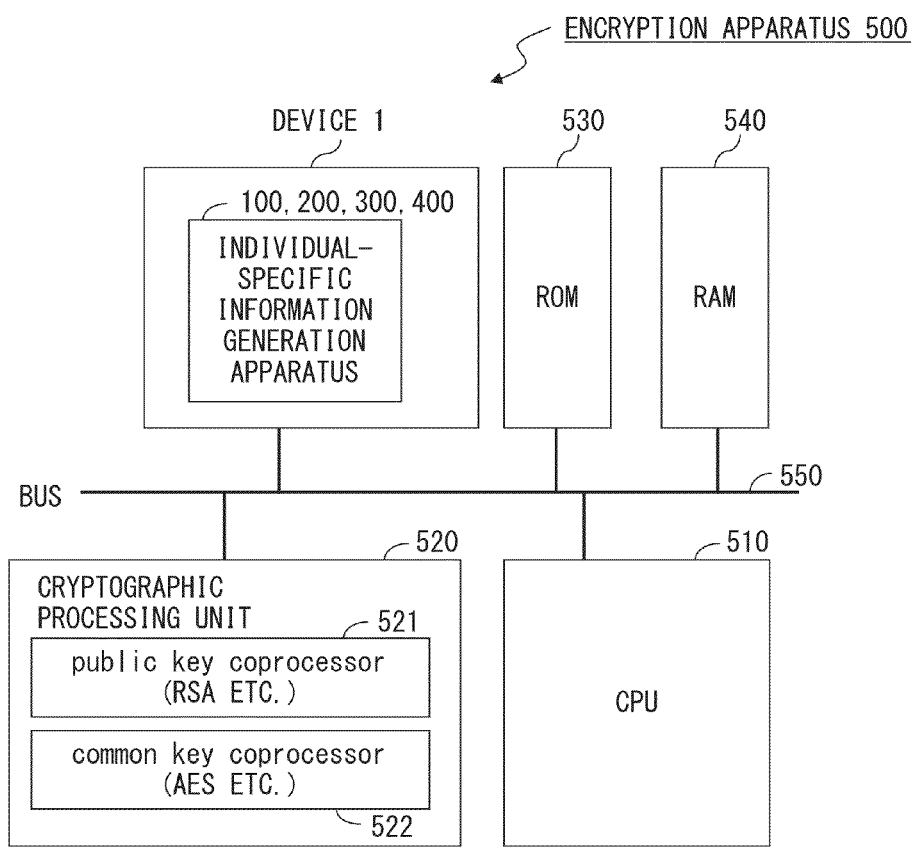
F I G. 26

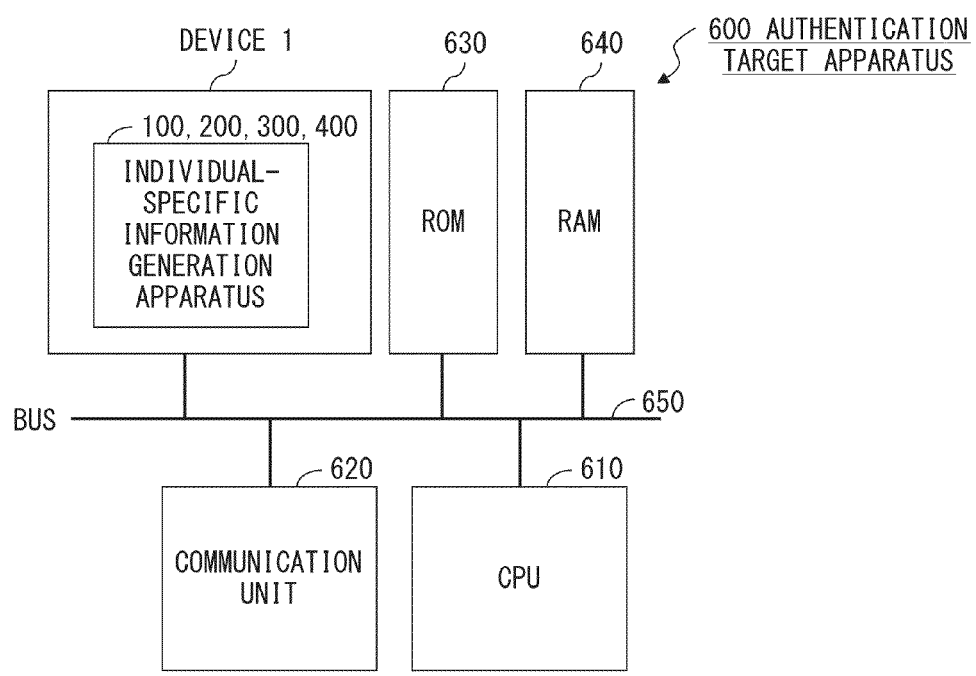
F I G. 2 7

INDIVIDUAL-SPECIFIC INFORMATION GENERATION APPARATUS AND INDIVIDUAL-SPECIFIC INFORMATION GENERATION METHOD

CROSS-REFERENCE TO RELATED APPLICATION

This application is a continuation application of International Application PCT/JP2010/061211 filed on Jun. 30, 2010 and designated the U.S. the entire contents of which are incorporated herein by reference.

FIELD

The embodiments discussed herein are related to a technique to generate individual-specific information that is unique to respective devices and is different between devices from each other.

BACKGROUND

In recent years, many counterfeit products have been seen against genuine products such as printer cartridges, battery cells and cartridges for video games. Counterfeit products have the same functions as genuine products, by using results of an internal structure analysis of the genuine products, an analysis of IC chips existing in the genuine products, and the like. There are many cases among these counterfeited products of infringement of rights of the genuine manufacturers that manufacture the genuine products, and there is a strong demand for a counterfeit-countermeasure technique.

As a preventive method for counterfeit products described above, an authentication function has been given to genuine products. One of effective measured to realize the authentication function is PUF (Physically Unclonable Function) in which a PUF circuit is embedded into a product that needs a countermeasure against counterfeit products.

The PUF is a function that returns a different output to respective devices on which the PUF is implemented. However, there is no need to individually set a function that outputs a different value for respective devices, and the same circuit realizes the function. That is, the PUF circuit makes its output for respective devices totally different, by using a slight difference in physical characteristics in the devices such as signal delay and device characteristics. Therefore, this output becomes a value that is unique to the device (referred to as "individual-specific information").

An ideal PUF circuit, once implemented on a device, outputs the same individual-specific information constantly for the device (Reliability), while PUFs implemented on different devices output totally different individual-specific information (Uniqueness). The output information of the PUF in devices described above may be compared to biological information such as the "fingerprint" for human. The fingerprint has the same characteristics as the output information of an ideal PUF, being unchanged for the same person with ages (Reliability), and on the other hand, while being totally different among different people (Uniqueness).

In addition, when PUF circuits of the same circuit configuration have the ideal reliability and uniqueness described above, even if the attacker breaks down the circuit and analyzes inside, it is impossible to generate a counterfeit chip.

The PUF is also used for the generation of identification information (ID) and the generation of a cryptographic key.

In many electronic device products, an individually unique ID is required. Conventionally, in many cases, a process to write in a different value for respective devices has been executed at the production stage. By using the PUF for the generation of the ID, the cost for this write-in process may be reduced.

In addition, for products including a cryptographic function, the use of the PUF improves the safety. A specific example is a smartcard in which an integrated circuit for information recording is embedded into a card. In addition, to ensure the confidentiality of communication, a cryptographic function is essential for SIM (Subscriber Identification Module) cards used for mobile phones and terminals for wireless Internet connection. By generating random numbers used for the generation of the cryptographic keys used for the encryption in these devices, the risk of the cryptographic key being analyzed by an attacker decreases significantly, improving the safety.

As the basic circuit configuration of the PUF, the Arbiter PUF and the Latch type PUF are explained first.

Meanwhile, in the following explanation herein, the high-level of the binary logic level with different potentials is expressed as the value "1", and the low level is expressed as the value "0".

First, the Arbiter PUF is explained. FIG. 1 is an illustration of the circuit configuration of the Arbiter PUF.

The Arbiter PUF 10 is configured including a total of 2n units of two-input/one-output selectors 11-0$a$, 11-0$b$, 11-1$a$, 11-1$b$, 11-2$a$, 11-2$b$, ..., 11-($n$−1)$a$ and 11-($n$−1)$b$, and a D-type flip-flop circuit 12.

Meanwhile, in the following explanation, when there is no particular need to distinguish, the, selector 11-0$a$, 11-0$b$, 11-1$a$, 11-1$b$, 11-2$a$, 11-2$b$, ..., 11-($n$−1)$a$ and 11-($n$−1)$b$ are collectively referred to as the "selectors 11".

To the first input terminal of the selector 11-1$a$ and 11-1$b$, the output terminal of the selector 11-0$a$ is connected, and to their second input terminal, the output terminal of the selector 11-0$b$ is connected. In addition, to the first input terminal of the selector 11-2$a$ and 11-2$b$, the output terminal of the selector 11-1$a$ is connected, and to their second input terminal, the output terminal of the selector 11-1$b$ is connected. A similar connection is performed for the rest of the selectors 11.

Meanwhile, to the selectors 11, a value cha[$n$−1:0] is input. This cha[$n$−1:0] is referred to as "challenge", which is for giving a selection instruction to the selectors 11 as to output the signal input to which of the two input terminals of the selectors 11 to the output terminal.

In the configuration in FIG. 1, for example, to both of the selector 11-1$a$ and 11-1$b$, cha[1] is input. The selector 11-1$a$ is supposed to perform an operation to output the signal input to the first input terminal to the output terminal when cha[1]=1, and to output the signal input to the second input terminal to the output terminal when cha[1]=0. On the other hand, the selector 11-1$b$ is supposed to perform an operation to output the signal input to the second input terminal to the output terminal when cha[1]=1, and to output the signal input to the first input terminal to the output terminal when cha[1]=0. Meanwhile, the other selectors 11 are also supposed to perform a similar operation.

In the Arbiter PUF 10, the D-type flip flop circuit 12 is referred to as the "Arbiter". To the data input terminal D of the D-type flip flop circuit 12, the output terminal of the selector 11-($n$−1)$a$ is connected, and to its clock input terminal CLK, the output terminal of the selector 11-($n$−1)$b$ is connected. The output of the D-type flip flop circuit 12 becomes the output R of the Arbiter PUF 10. Meanwhile, the D-type flip flop circuit 12 is reset with initialization and its output becomes 0.

As described above, the Arbiter PUF 10 has a symmetrical configuration in which every n units of a total of 2n units of selectors 11 are connected in series to the D-type flip flop circuit 12. In addition, it is also preferable to make the wiring lengths of the connection between the selectors 11 and the connection between the selector 11-$(n-1)a$ and 11-$(n-1)b$ and the D-type flip flop circuit 12 as much as possible, to maintain the symmetry.

The Arbiter PUF 10 is a circuit that realizes the PUF using circuit delay.

To the Arbiter PUF 10, an edge signal that causes a state change in the D-type flip flop circuit 12 once input to the clock terminal of the D-type flip flop circuit 12 is input as an input signal. In this embodiment, the edge signal is assumed as a rising edge signal that changes the logic level from 0 to 1.

The rising edge signal input to the Arbiter PUF 1-is input to the first input terminal and the second input terminal of the selectors 11-$0a$ and 11-$0b$. Then, the edge signal goes through the selectors 11 in the route according to the value of the challenge cha[n−1:0] and reaches the data input terminal D and the clock input signal CLK of the D-type flip flop circuit 12 being the arbiter.

The output of the D-type flip flop circuit 12 is decided by the change point from 0 to 1 of the rising edge signal reached first to which of the data input terminal D and the clock input terminal CLK, and the output becomes the output of the Arbiter PUF 10 That is, when the change point reaches the clock input terminal CLK first, the output R of the Arbiter PUF becomes 0, and when the change point reaches the data input terminal D first, the output R of the Arbiter PUF 10 becomes 1.

As descried earlier, the Arbiter PUF 10 has a symmetrical configuration in which every n units of a total of 2n units of selectors 11 are connected in series. In addition, as described earlier, the wiring lengths between the respective elements are configured to be approximately equal. Therefore, in the circuit logic, the arrival of the rising edge signal at the data input terminal D and the clock input terminal CLK is at the same time, and the rising edge signals arriving at the two are supposed to be in the same phase. However, actually, there are cases in which the arrival of the rising edge signals at the two are not at the same time due to gate delay and line delay caused by the implementation conditions on the electronic device. The degree of the uniqueness in the arrival time is specific to the electronic device, while different for each device. That is, the degree of the uniqueness in the arrival time has the reliability and uniqueness that are the characteristics of the PUF described earlier, and may be used as the individual-specific information of the electronic device on which the Arbiter PUF 10 is implemented.

As described above, the Arbiter PUF 10 in FIG. 1 is configured to input the edge signal that causes a state change in the D-type flip flop circuit 12 to its clock terminal and also to input the edge signal logically in the same phase as the edge signal to its data input terminal. Then, the configuration is made so that the signal output from the output terminal of the D-type flip flop circuit 12 becomes the output of the Arbiter PUF 10.

In addition, as described above, the Arbiter PUF 10 is able to change the route in which the rising edge signal goes through the selector 11 by the value of the challenge Cha[n−1:0]. Therefore, when the value of the challenge Cha[n−1:0] is changed, a different value of output R is obtained. This output is referred to as a "response".

Then, the relationship between the challenge Cha[n−1:0] and the response R in the Arbiter PUF 10 implemented on a specific device is studied in advance and recorded. By doing so, by studying the relationship of the challenge Cha[n−1:0] and the response R of the Arbiter PUF 10 of a device being the check target and checking it against the recorded content above, authentication may be performed as to whether the check target device is the specific device.

Next, the Latch-type PUF is explained. The Latch-type PUF realizes the PUF using metastable of the RS latch circuit.

First, metastable is explained using FIG. 2A and FIG. 2B.

FIG. 2A illustrates a circuit configuration example of the RS latch circuit. The RS latch circuit is constituted using NAND (negative AND) circuits 21 and 22.

The input of the RS latch circuit is negative logic. Meanwhile, in the drawing, the negative logic signal is expressed by adding an overbar on the signal name, while the negative logic signal is described herein as "#". Therefore, for example, set input of the RS latch circuit in FIG. 2A is described as "#S", and reset input is described as "#R".

To the two inputs of the NAND circuits 21, respectively, the set input "#S" and the output of the NAND circuit 22 are input. Meanwhile, to the two inputs of the NAND circuit 22, respectively, the reset input "#R" and the output of the NAND circuit 21 are input. In addition, the output of the NAND circuit 21 becomes the output Q of the RS latch circuit. Meanwhile, from the output of the NAND circuit 22, output "#Q" is output.

FIG. 2B is the truth table of the RS latch circuit of FIG. 2A. Meanwhile, in the truth table, the set input S and the reset input R are described in positive logic.

As is understood from the truth table, in the RS latch circuit in FIG. 2A, the output value is maintained as it is and Q=Q, and "#Q"="#Q" when the input S=0 and the input R=0. In addition, in the RS latch circuit, the output value is reset and, Q=0, and "#Q"=1 when the input S=0 and the input R=1. Furthermore, in the RS latch circuit, the output value is set and Q=1, "#Q"=0 when the input S=1 and the input R=0.

The logic of the output of the RS latch circuit in FIG. 2A is stable with any one of the combinations above. However, in the RS latch circuit, Q="#Q"=1 when with input S=1 and input R=1. That is, in this case, the logic value of Q and the logic value of "#Q" that are supposed to indicate reverse logic become both "1". At this time, the outputs of the RS latch circuit are both in the unstable state of the midpoint potential. Such an unstable state that is abnormal as a digital circuit is called metastable. Generally, in order to avoid such a state of metastable, input of S=1 and R=1 to the RS latch circuit is prohibited.

Next, the latch-type PUF using metastable of the RS latch circuit as described above is explained. FIG. 3 is a circuit configuration example of the latch-type PUF.

The latch-type PUF 20 is configured so that the same value A is input to both the set input "#S" and reset input "#R" of the RS latch circuit in FIG. 2A. There, the output Q and the output "#Q" of the RS latch circuit being the output of the PUF are assumed as B and C, respectively. That is, the latch-type PUF 20 is a circuit configured so that inputs are given to the RS latch circuit to make it enter the metastable state, and the signals output from the output terminal of the RS latch circuit become the output of the latch-type PUF 20.

In the latch-type PUF 20, when the input A=0, the output B and the output C both become 1, and the value of the output is stable in this state. However, here, when the value A is changed from 0 to 1, a state in which the output B is 1 and the output C is 0, and a state in which the output B is 0 and the output C is 1 are generated, making the output unstable. This is because the RS latch circuit is put in the metastable state, and its output is in the uncertain state. The latch-type PUF 20 is a PUF that utilizes this uncertainty.

The output of the latch-type PUF 20 takes one of the two values (0 and 1). However, when the latch-type PUF 20 is implemented on the device, three modes including one that always outputs 0, one that always outputs 1, one whose output is 0 or 1 and not fixed, that is, one that inputs a random number are obtained, and this modes of the output has reliability. Then, a plurality of the latch-type PUF 20 may be implemented on a device, and the outputs obtained may be used as individual-specific information about the device on which the latch-type PUF 20 is implemented.

Next, FIG. 4 is explained. FIG. 4 is an illustration of the individual-specific information generation apparatus being the background art.

The individual-specific information generation apparatus 30 is configured by implementing a plurality (n units) of the latch-type PUF 20 illustrated in FIG. 3 on a device 1 being an electronic device.

In the individual-specific information generation apparatus 30, choosing one of the n units of the latch-type PUFs 20 corresponds to the challenge described earlier. FIG. 4 represents a condition in which, by the challenge, 6 units of latch-type PUFs 20 from "latch 0" through "latch 5" are selected. The respective outputs RES[5:0] of the 6 units of latch-type PUFs 20 takes binary values (0 or 1), and these values are arranged to form a 6-bit bit string. The bit string becomes the response (characteristic value) described earlier, and may be used as individual-specific information of the device 1. Meanwhile, the number of pattern of individual-specific information that the individual-specific information generation apparatus 30 is, 2 to the sixth power patterns since a total of 6 latch-type PUF 20 are selected, that is, 64 patterns.

However, as described above, the latch-type PUF may output a random number. FIG. 4 represents a case in which the "latch 2" and the "latch 3" among the total of 6 units of the latch-type PUFs 20 output a random number. When the latch-type PUF 20 that outputs a random number is included in the selection by the challenge, the response that is supposed to be unchanged in the device 1 may become a different value, eliminating the reliability and making the use as a PUF impossible.

In this regard, a technique in which the individual-specific information generation apparatus 30 is equipped with a code error correction circuit has been known. In this technique, the configuration is made so that a bit string composed by arranging outputs of latch-type PUF 20 selected by the challenge are input to the code error correction circuit, and its output becomes the response of the individual-specific information generation apparatus 30. That is, the random number included in the bit string generated as described above from the latch-type PUF 20 is corrected by the code error correction circuit, so that the same response is constantly obtained for the same challenge in the device 1. In this technique, as described above, the reliability of the output of the individual-specific information generation apparatus 30 is maintained.

Meanwhile, it is also possible configure, in the individual-specific information generation apparatus 30 in FIG. 4, replacing the latch-type PUF 20 with the Arbiter PUF 10 in FIG. 1.

While the output of the Arbiter PUF 10 also takes one of the two values (0 and 1), when the different of the arrival times of the rising edge signals to the data input terminal D and the clock input terminal CLK is extremely small, the output may become a random number. That is, in a similar manner to the latch-type PUF 20, the Arbiter PUF 10 is also a digital circuit that individually outputs an output value being a prescribed output value (0 or 1) or a random number without the output with respect to a certain input being unambiguously determined. Therefore, the correction by the code error correction circuit on the bit string generated from the output of the Arbiter PUF 10 has an effect to maintain the reliability.

As other background techniques, several techniques to generate a random value using the uniqueness in physical characteristics of electronic devices. One of them is a technique to generate a random number in which a digital output value that is not unambiguously determined with respect to a digital input value and to equalize the frequencies of occurrence of "0" and "1" in the digital output value.

Patent Document 1: U.S. Pat. No. 3,604,674

Non-patent Document 1: Jae W. Lee and 5 others, "A technique to build a secret key in integrated circuits with identification and authentication applications". IEEE VLSI Circuits Symposium. June 2004.

Non-patent document 2: Sandeep S. Kumar and 4 others, "Extend Abstract: The Butterfly PUF: Protecting IP on every FPGA". IEEE International Workshop on Hardware-Oriented Security and Trust—HOST, 2008.

Non-patent Document 3: G. Edward. Suh and another, "Physical Unclonable Functions for Device Authentication and Secret Key Generation". Design Automation Conference, June 2007.

SUMMARY

In the individual-specific information generation apparatus 30 in FIG. 4, even if a code error correction circuit is provided as described above, there may still be a case in which it is impossible to maintain the reliability of individual-specific information. For example, a case in which the individual-specific information generation apparatus 30 is configured by implementing 128 units of the latch-type PUF 20 is considered. In this case, when the number of the latch-type PUFs 20 that output a random number exceeds about expected values, the code error correction circuit alone may not be able to absorb the uniqueness in the values of the bit string composed by arranging the outputs of the latch-type PUFs 20. That is, in this case, uniqueness responses are to be output to the same challenge for the same device 1, lacking reliability and making it impossible to be used as a PUF.

In addition, in the individual-specific information generation apparatus 30 in FIG. 4, to provide a code error correction circuit as described above also have a problem of raising the implementation cost of the individual-specific information generation apparatus 30.

One of individual-specific information generation apparatuses described herein later is one that generates individual-specific information. The individual-specific information generation apparatus has a plurality of digital circuits, a random number judgment unit and an individual-specific information generation unit. Here, the plurality of digital circuits has the same circuit configuration. The respective digital circuits output individually prescribed fixed output value or a random number output value, without their outputs to a certain input being determined unambiguously. Meanwhile, the order of the respective digital circuits is defined in advance. Meanwhile, the random number judgment unit judges whether the output value is a random value or fixed, about each of the plurality of digital circuits. Then, the individual-specific information generation unit generates the individual-specific information based on information of order defined in the digital circuit judged by the random number judgment unit as having a fixed output value among the plurality of digital circuits and the output value.

Meanwhile, one of individual-specific information generation methods described herein later is generation of the individual-specific information. In this method, first, judgment as to whether the output value output from a plurality of digital circuits is a random number or fixed is performed about each of the plurality of digital circuits. The plurality of digital circuits have the same circuit configuration, and the respective digital circuits output individually prescribed fixed output value or a random number output value, without their outputs to a certain input being determined unambiguously. Meanwhile, the order of the respective digital circuits is defined in advance. Then, in this method, generation of the individual-specific information described above is performed based on information of order defined in the digital circuit judged by the random number judgment unit as having a fixed output value among the plurality of digital circuits and the output value.

The individual-specific information generation apparatuses describe herein later are capable of generating individual-specific information having a good reliability and uniqueness with a little circuit scale.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a circuit configuration example of an Arbiter PUF.

FIG. 2B is a true table of the RS latch circuit in FIG. 2A.

FIG. 3 is a circuit configuration example of a latch-type PUF.

FIG. 4 is an individual-specific information generation apparatus of the background art.

FIG. 5 is a first example of the individual-specific information generation apparatus.

FIG. 6 is a first example of the circuit configuration of the random number judgment unit.

FIG. 8 is a second example of the individual-specific information generation apparatus.

FIG. 10 is a first example of the specific circuit configuration of the random number judgment unit and an output conversion unit of the individual-specific information generation unit in FIG. 8.

FIG. 12 is a second example of the specific circuit configuration of the random number judgment unit and an output conversion unit of the individual-specific information generation unit in FIG. 8.

FIG. 13B is a second example of the circuit configuration of a second conversion circuit.

FIG. 14 is a third example of the specific circuit configuration of the random number judgment unit and an output conversion unit of the individual-specific information generation unit in FIG. 8.

FIG. 15 is a diagram to explain replacement of the latch PUF with the Arbiter PUF in the circuit configuration in FIG. 10.

FIG. 16 is a diagram to explain replacement of the latch PUF with the Arbiter PUF in the circuit configuration in FIG. 12.

FIG. 17 is a diagram to explain replacement of the latch PUF with the Arbiter PUF in the circuit configuration in FIG. 14.

FIG. 24 is a diagram to explain replacement of the latch PUF with the Arbiter PUF in the circuit configuration in FIG. 21.

FIG. 26 is a configuration example of an encryption apparatus equipped with an individual-specific information generation apparatus.

FIG. 27 is an configuration example of an authentication target apparatus equipped with an individual-specific information generation apparatus.

DESCRIPTION OF EMBODIMENTS

Figure 2A:
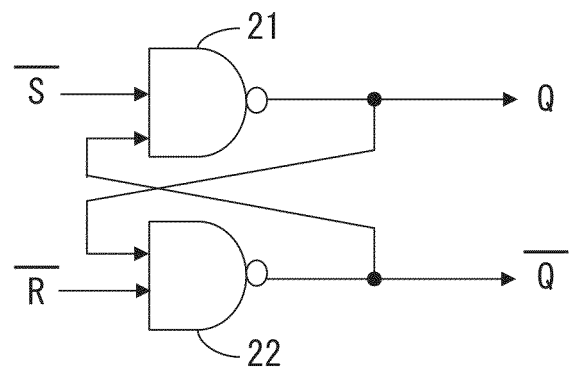
FIG. 2A is a circuit configuration example of an RS latch circuit.

The present invention has been made in view of the above situation, and to make it possible to generate individual-specific information that has a good reliability and uniqueness with a little circuit scale.

MEANS TO SOLVE THE PROBLEM

First, FIG. 5 is explained. FIG. 5 is an illustration of a first example of the individual-specific information generation apparatus.

The individual-specific information generation apparatus 100 is configured by implementing a plurality (n units) of a latch-type PUFs 20 and a random number judgment unit 40 on a device 1 being an electronics device, and further implementing an individual-specific information generation unit 50.

The Latch-type PUF 20 has the same configuration as in the one in FIG. 3, configured so that input is given to the RS latch circuit to make it enter the metastable condition and that the signal output from the output terminal of the RS latch circuit becomes the output of the latch-type PUF. Meanwhile, an order is defined in advance for each of n units of the latch-type PUFs 20 in the same circuit configuration.

In the individual-specific information generation apparatus 100 also, which one to select from the n units of the implemented latch-type PUF corresponds to the challenge described above. FIG. 5 represents the state in which a total of 6 units of the latch-type PUFs 20 are selected by the challenge.

The random number judgment unit 40 whether the output value of each of the latch-type PUF 20 is a random number or fixed.

The individual-specific information generation unit 50 generates individual-specific information of the device 1 based on information of the order defined in each of the ones that were judged by the random number judgment unit 40 as having a fixed output value among the latch-type PUF 20.

Next, the operations of the random number judgment unit 40 and the individual-specific information generation unit 50 are explained.

First, FIG. 6 is explained. FIG. 6 illustrates the first example of the circuit configuration of the random number judgment unit 40.

In FIG. 6, the random number judgment unit 40 is configured including an AND circuit 41, NOT circuits 42 and 44, D-type flip flop circuits 43 and 46, an OR circuit 45, and an EXOR circuit 47.

The AND circuit 41 is a 2-input AND circuit. To one of the inputs of the AND circuit 41, the output of the latch-type PUF 20 is input, and to the other input, the output of the NOT (NOT) circuit 44 is connected. The output of the AND circuit 41 is connected to the input of the NOT circuit 42, and the output of the NOT circuit 42 is connected to the data input of the D-type flip flop circuit 43. The D-type flip flop circuit (hereinafter, abbreviated as "D-FF") is connected to the input of the NOT circuit 44.

The OR circuit 45 is a 2-input OR circuit. To one of the inputs of the OR circuit 45, the output of the latch-type PUF 20 is input, and to the other input, the output of the D-FF 46 is connected. The output of the OR circuit 45 is connected to the data input of the D-FF 46.

The EXOR circuit 47 is a 2-input exclusive OR circuit. To one of the inputs of the EXOR circuit 47, the output of the NOT circuit 44 is connected, and to the other input, the output of the D-FF 46 is connected. The output of the EXOR circuit 47 becomes the output of the random number judgment unit 40.

Meanwhile, the D-FF s 43 and 46 are reset upon initialization and their output becomes 0.

First, the operation of the random number judgment unit 40 in a case in which the output of the latch-type PUF 20 is constantly 0 is explained.

At this time, since the output of the AND circuit 41 is 0, 1 is input to the D-FF 43 by the function of the NOT circuit 42. Then, since the output of the D-FF 43 also becomes 1, the output of the NOT circuit 44 becomes 0.

Incidentally, since the D-FF 46 has been initialized, its output is 0. Therefore, at this time, since both the inputs of the OR circuit 45 are 0, its output becomes 0. Since the output is input to the D-FF 46, the output of the D-FF 46 is still remains as 0.

Therefore, since the two inputs of the EXOR circuit 47 are both 0, its output becomes 0.

Next, the operation of the random number judgment unit 40 in a case in which the output of the latch-type PUF 20 is constantly 1 is explained.

First, since the D-FF 43 has been initialized, its output is 0. Therefore, at this time, since both the two inputs of the AND circuit 41 are 1, its output becomes 1. Then, 0 is input to the D-FF 42 by the function of the NOT circuit 42. Then, since the D-FF 43 output becomes 0, the output of the NOT circuit 44 becomes 1.

Meanwhile, at this time, since the output of the OR circuit 45 becomes 1 and the output is input to the D-FF 46, the output of the D-FF 46 becomes 1.

Therefore, since both the two inputs of the EXOR circuit 47 are 1, its output becomes 0.

Next, the operation of the random number judgment unit 40 in a case in which the output of the latch-type PUF 20 is a random number (the output is not fixed as either of 0 and 1) is explained.

As described above, with the D-FF 43 initialized to 0, its output becomes 1 when the output of the latch-type PUF 20 becomes 0, and therefore, the output of the NOT circuit 44 becomes 0. After that, since even if the output of the latch-type PUF 20 becomes 1, the output of the AND circuit 41 remains as 0, 1 is maintained as the output of the D-FF 43, and therefore, the output of the NOT circuit 44 is retained as 0.

Meanwhile, with the D-FF 46 that has been initialized to 0, its output becomes 1 when the output of the latch-type PUF 20 becomes 1. After that, since even if the output of the latch-type PUF 20 becomes 0, the output of the OR circuit 45 remains as 1, 1 is maintained as the output of the D-FF 43.

Therefore, in the case in which the output of the latch-type PUF 20 is a random number (the output is not fixed as either of 0 and 1), since one of the two inputs of the EXOR circuit 47 become 0 and the other becomes 1, its output becomes 1.

As described above, with the random number judgment unit 40, its output value becomes 0 when the latch-type PUF 20 keeps outputting only one of 0 and 1 constantly, and its output value becomes 1 when the latch-type PUF 20 outputs a random number. The random number judgment unit 40 judges whether the output of the latch-type PUF 20 is an output value of a random number or a fixed output value as described above.

Next, more specific operation details of the individual-specific information generation unit 50 are explained.

The individual-specific information generation unit 50 in FIG. 5 generates individual-specific information of the device 1 by arranging the outputs of the ones that are judged by the random number judgment unit 40 as having a fixed output value among the latch-type PUFs 20 according to information of their order. At this time, regarding the ones that are judged as having a random number as the output value among the latch-type PUF 20, the individual-specific information generation unit 50 discards their output (that is, the output value being a random number) and does not use it for the generation of the individual-specific information.

Figure 7:
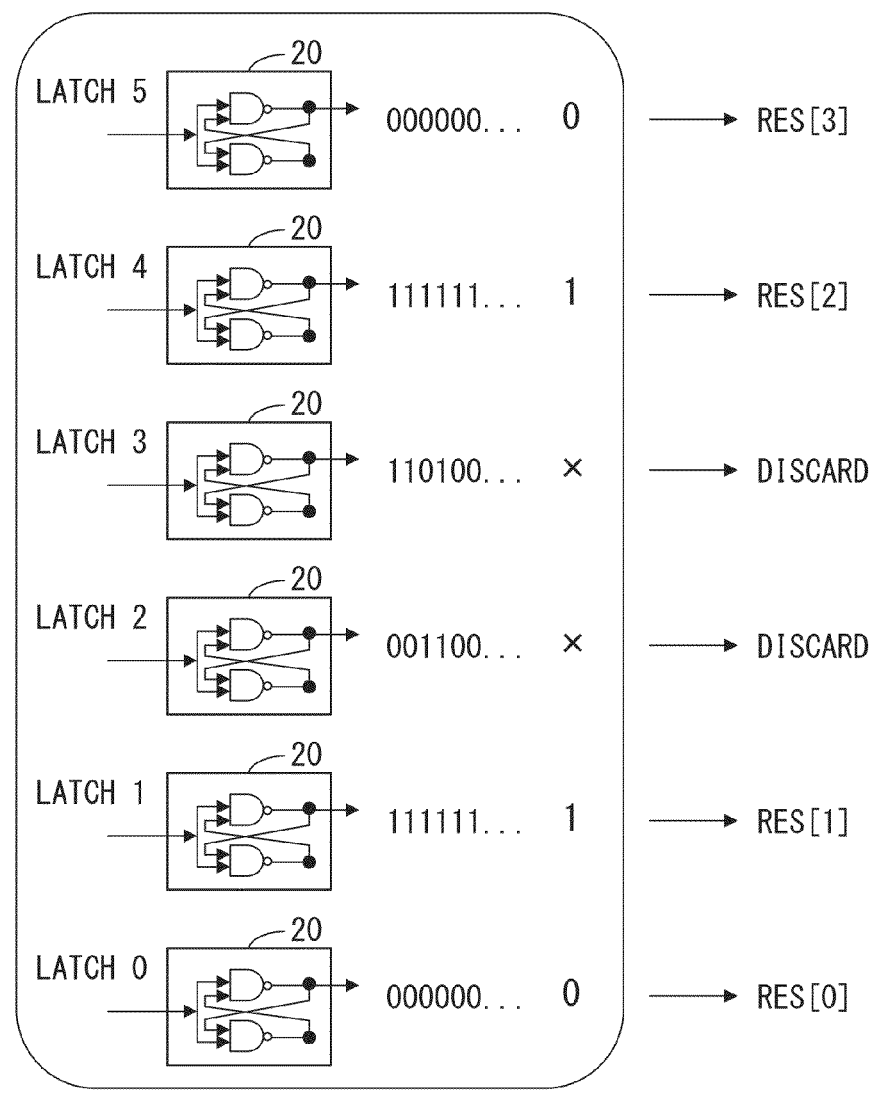
FIG. 7 is a diagram to explain the operation of the individual-specific information generation unit in FIG. 5.

The operation of the individual-specific information generation unit 50 is further explained using FIG. 7.

The total of 6 units of the latch-type PUFs 20 from the "LATCH 0" through the "LATCH 5" illustrated in FIG. 7 are those selected by the challenge, and represent the order mentioned earlier that have been defined for those selected ones by the numbers from "LATCH 0" through "LATCH 5". Here, FIG. 6 represents that the "LATCH 2" and "LATCH 3" among the total of 6 units of the latch-type PUFs 20 are outputting a random number output value.

The random number judgment unit 40 judges that the "LATCH 2" and "LATCH 3" among the total of 6 units of the latch-type PUFs 20 are outputting a random number output value and the others are outputting a fixed output value, and transmits the judgment result to the individual-specific information generation unit 50. Then, the individual-specific information generation unit 50 discards the output of the "LATCH 2" and "LATCH 3", generates a bit string by arranging respective outputs of the "LATCH 0", "LATCH 1", "LATCH 4", "LATCH 5" according to this order, and outputs it as individual-specific information of the device 1.

It becomes possible for the individual-specific information generation apparatus 100 to generate and output the individual-specific information of the device 1 as the individual-specific information generation unit 50 performs the operation described above.

Meanwhile, in the individual-specific information generation apparatus 100 in FIG. 5, it is also possible to make the configuration while replacing the latch-type PUF 20 with the Arbiter PUF 10 in FIG. 1. As mentioned earlier, the Arbiter PUF 10 is configured to input an edge signal that causes a state change in the D-type flip flop circuit 12 to its clock terminal, and to input an edge signal having the logically same phase as the edge signal to its data input terminal. Then, the signal output from the output terminal of the D-type flip flop circuit 12 is configured to become the output of the Arbiter PUF 10. Furthermore, the configuration may also be made while replacing the latch-type PUF 20 with another digital circuit that performs a similar operation, that is, another digital circuit that individually outputs an output value being a prescribed fixed output value or a random number without the output with respect to a certain input being unambiguously determined.

Next, FIG. 8 is explained. FIG. 8 illustrates the second example of the individual-specific information generation apparatus.

The individual-specific information generation apparatus 200 in FIG. 8 is implemented on the device 1 being an electronics device. The individual-specific information generation apparatus 200 is the one in which the individual-specific information generation apparatus 100 illustrated in FIG. 5 is changed to input the output of the latch-type PUF 20 and the random number judgment unit 40 to an output conversion unit 60 and to input its output to the individual-specific information generation unit 50.

In the generation of individual-specific information by the individual-specific information generation apparatus 100 in FIG. 5, since the outputs of two units among the total of 6 units of latch-type PUFs 20 are discarded, the number of possible patterns of the individual-specific information decreases to 2 to the fourth power, that is, 16 patterns. When the number of patterns of the individual-specific information is small, the possibility that different devices have the same individual-specific information becomes high. This means that the difference described earlier is low, limiting the range of usage as the PUF.

Therefore, in the individual-specific information generation apparatus 200, in addition to the operation in the first example described earlier, the individual-specific information generation unit 50 generates individual-specific information of the device 1 also based on information of the order defined in each of the latch-type PUFs 20 that are judged as having a random number output value.

The output conversion unit 60 converts the output of the ones that are judged by the random number judgment unit 40 as having a random number output value among the latch-type PUF 20 into a prescribed fixed value. At this time, the individual-specific information generation unit 50 generates the individual-specific information by arranging the output of the ones that are judged by the random number judgment unit 40 as having a fixed output value among the latch-type PUF 20 and the prescribed value after the conversion. Meanwhile, in arranging the respective outputs, the respective outputs are arranged according to the information of the order defined in each of the latch-type PUF 20.

Figure 9:
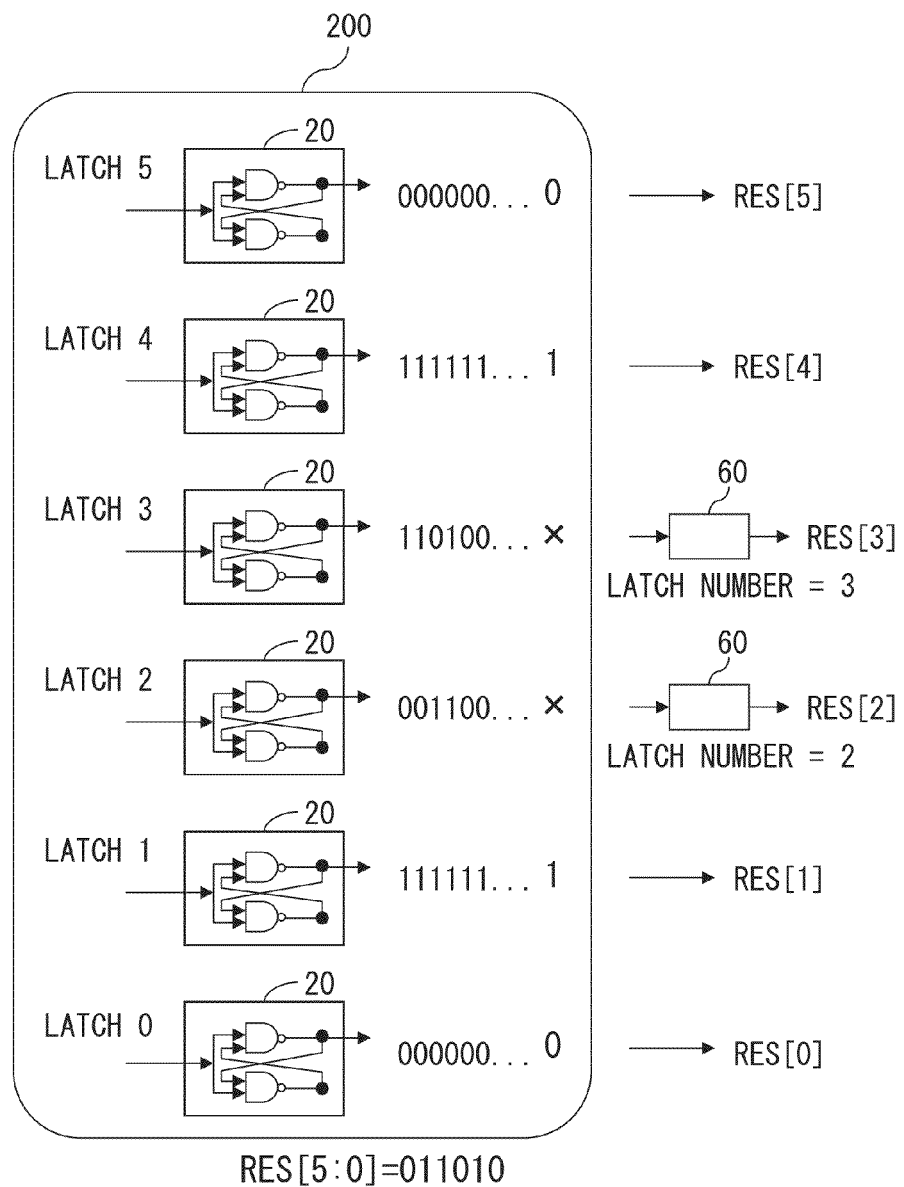
FIG. 9 is a diagram to explain the operation of the individual-specific information generation unit in FIG. 8.

The operation of the individual-specific information generation unit 50 is further explained using FIG. 9.

The total of six units of the latch-type PUFs 20 from the "LATCH 0" through the "LATCH 5" illustrated in FIG. 9 are those selected by the challenge, and represent the order mentioned earlier that have been defined for those selected ones by the numbers from "LATCH 0" through "LATCH 5". Here, FIG. 9 represents a case in which the "LATCH 2" and "LATCH 3" among the total of six units of the latch-type PUFs 20 output a random number output value.

The random number judgment unit 40 judges that the "LATCH 2" and "LATCH 3" among the total of six units of the latch-type PUFs 20 are outputting a random number output value and the others are outputting a fixed output value, and transmits the judgment result to the output conversion unit 60. Then, the output conversion unit 60 converts the random number output by the "LATCH 2" and "LATCH 3" into a prescribed fixed value, and outputs the prescribed value as the output of the "LATCH 2" and "LATCH 3" to the individual-specific information generation unit 50. The individual-specific information generation unit 50 generates a bit string by arranging the respective outputs of the "LATCH 0" through "LATCH 5" according to this order, and outputs it as individual-specific information of the device 1.

Thus, the individual-specific information generation apparatus 200 has a characteristic that the order information of the "latches" that are selected by the challenge and output the random number output value is used for the generation of the individual-specific information. In the individual-specific information generation apparatus 200 having this characteristic, the number of possible patterns does not depend on whether the "latches" outputs a random number output value, and the number of patterns that is approximately proportional to the number of "latches" to be implemented is available. More specifically, assuming the number of the "latches" as N, the number of possible patterns of individual-specific information is 2 to the N-th power. Therefore, the decrease in the difference mentioned earlier is suppressed.

Next, the specific circuit configuration of the random number judgment unit 40 and the output conversion unit 60 in FIG. 8 is explained.

First, FIG. 10 is explained. FIG. 10 illustrates the first example of the specific circuit configuration of the random number judgment unit 40 and the output conversion unit 60 of the individual-specific information generation apparatus 200 in FIG. 8.

FIG. 10 is the one in which the output of the latch-type PUF 20 is input to the first conversion circuit 70, and the output of the first conversion circuit 70 is input to the individual-specific information generation unit 50.

A first conversion circuit 70 combines the operations respectively performed by the random number judgment unit 40 and the output conversion unit 60 in FIG. 8. That is, the first conversion circuit 70 operates to judge whether the output of the latch-type PUF 20 is a random number or fixed, and also to convert the output of the ones that are judged as having a random number output value into a prescribed fixed value "1".

Figure 11A:
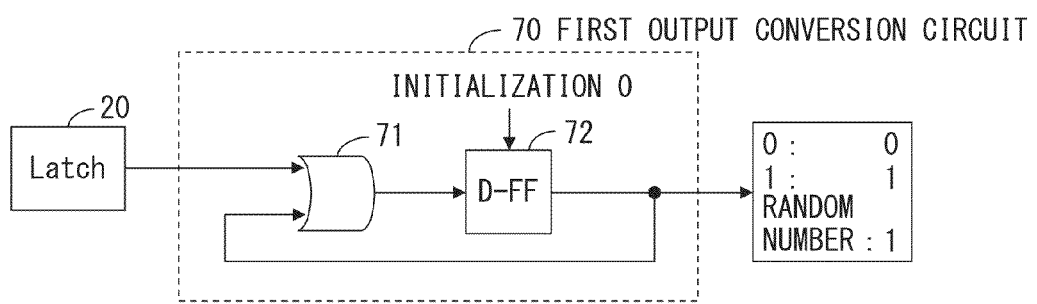
FIG. 11A is a first example of the circuit configuration of a first conversion circuit.
Figure 11B:
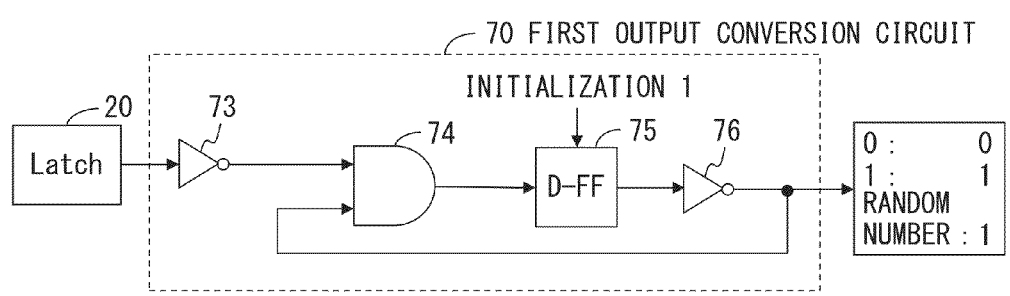
FIG. 11B is a second example of the circuit configuration of a first conversion circuit.

Here, FIG. 11A and FIG. 11B are explained. FIG. 11A and FIG. 11B are examples of the first example and the second example of the first conversion circuit 70, respectively.

First, the first example in FIG. 11A is explained.

In FIG. 11A, the first conversion circuit 70 is configured including an OR circuit 71 and a D-FF 72.

To one of the inputs of the 2-input OR circuit 71, the output of the latch-type PUF 20 is input, and to the other input, the output of the D-FF 72 is connected. The output of the OR circuit 71 is connected to the input of the D-FF 72, and the output of the D-FF 72 becomes the output of the first conversion circuit 70. Meanwhile, the D-FF 72 is reset upon initialization and its output becomes 0.

When the output of a latch-type PUF 20 is constantly 0, the D-FF 72 has been initialized to 0. Therefore, since both the two inputs of the OR circuit 71 are 0, its output becomes 0. Since the output is input to D-FF 72, the output of the D-FF 72 still remains as 0. Therefore, the output of the first conversion circuit 70 in this case becomes 0.

Meanwhile, when the output of the latch-type PUF 20 becomes 1 even for a very short period, the output of the OR circuit 71 becomes 1, and since the output is input to the D-FF 72, the output of the D-FF 72 also becomes 1. After that, even if the latch-type PUF 20 becomes 0, the output of the D-FF 72 is 1, and therefore the output of the OR circuit 71 remains as 1, and 1 is maintained as the output of the D-FF 72. Therefore, in both of the cases in which the output of the latch-type PUF 20 is constantly 1 and the output value of the latch-type PUF 20 is a random number (the output is 0 or 1 and not fixed), the output of the first conversion circuit 70 is 1.

As described above, the first conversion circuit 70 of FIG. 11A outputs, when the output of the latch-type PUF 20 is constantly 0 and constantly 1, its output as its own output, and when the output value of the latch-type PUF 20 is a random number, converts its output into a prescribed fixed value "1" and outputs it.

Next, the second example in FIG. 11B is explained.

In FIG. 11B, the first conversion circuit 70 is configured including NOT circuits 73 and 76, an AND circuit 74 and a D-FF 75.

To the input of the NOT circuit 73, the output of the latch-type PUF 20 is input. The output of the NOT circuit 73 is connected to the other of the AND circuit 74 being a 2-input AND circuit, and to the other of the AND circuit 74, the output of the D-FF 75 is connected. The output of the D-FF 75 is also connected to the input of the NOT circuit 76. The output of the NOT circuit 76 becomes the output of the first conversion circuit 70. Meanwhile, the D-FF 75 is reset upon initialization and its output becomes 1.

When the output of the latch-type PUF 20 is constantly 0, 1 is constantly input to the other of the inputs of the AND circuit 74 by the function of the NOT circuit 73. In addition, at this time, since the D-FF 72 has been initialized to 1, 1 is also input to the other of the inputs of the AND circuit 74. Therefore, at this time, the output of the AND circuit 74 becomes 1, and since the output is input to D-FF 75, 1 is maintained as the output of the D-FF 75. Therefore, by the function of the NOT circuit 76, the output of the first conversion circuit 70 at this time becomes 0.

Meanwhile, when the output of the latch PUF 20 becomes 1 even for a very short period, since 0 is input to one of the inputs of the AND circuit 74 by the function of the NOT circuit 73, the output of the AND circuit 74 becomes 0. Since the output if input to the D-FF 75, the output of the AND circuit 75 also becomes 0. After that, even if the output of the latch-type PUF becomes 0 and 1 is input to one of the inputs of the AND circuit 74 by the function of the NOT circuit 73, since 0 remains as the input to the other, and the output of the AND circuit 74 is 0, and 0 is maintained as the output of the D-FF 75. Therefore, by the function of the NOT circuit 76, the output of the first conversion circuit 70 becomes 1 in both of the cases in which the output of the latch-type PUF 20 is constantly 1 and the output value of the latch-type PUF 20 is a random value (the output is 0 or 1 and not fixed).

As described above, the first conversion circuit 70 in FIG. 11B also outputs, when the output of the latch-type PUF 20 is constantly 0 and constantly 1, its output as its own output, and when the output value of the latch-type PUF 20 is a random number, converts its output into a prescribed fixed value "1" and outputs it.

Next, FIG. 12 is explained. FIG. 12 illustrates the second example of the specific circuit configuration of the random number judgment unit 40 and the output conversion unit 60 of the individual-specific information generation apparatus 200 in FIG. 8.

FIG. 12 is the one in which the output of the latch-type PUF 20 is input to the second conversion circuit 80 and the output of the second conversion circuit 80 is input to the individual-specific information generation unit 50

The second conversion circuit 80 combines the operations respectively performed by the random number judgment unit 40 and the output conversion unit 60 in FIG. 8, in a similar manner to the first conversion circuit 70 in FIG. 10. However, the second conversion circuit 80 operates to judge whether the output value of the latch-type PUF 20 is a random value or fixed, and also to convert the output of the ones that are judged as having a random number output value into a prescribed fixed value "0".

Figure 13A:
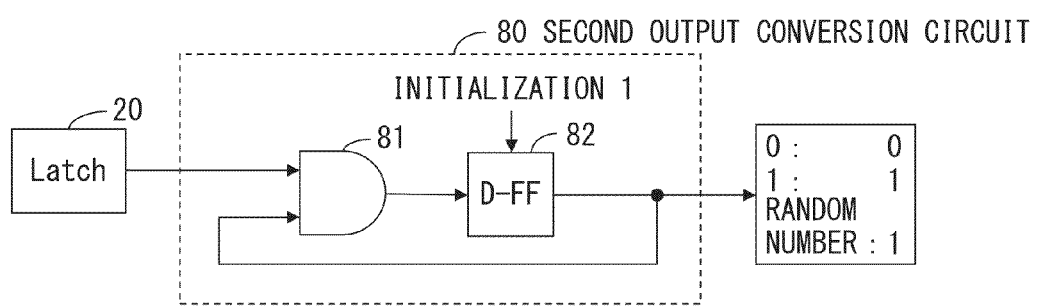
FIG. 13A is a first example of the circuit configuration of a second conversion circuit.

Here, FIG. 13A and FIG. 13B are explained. FIG. 13A and FIG. 13B are examples of the first example and the second example of the second conversion circuit 80, respectively.

In FIG. 13A, the second conversion circuit 80 is configured including an AND circuit 81 and a D-FF 82.

To one of the inputs of the AND circuit 81 being a 2-input AND circuit, the output of the latch-type PUF 20 is input, and to the other input, the output of the D-FF 82 is connected. The output of the AND circuit 81 is connected to the input of the D-FF 82, and the output of the D-FF 82 becomes the output of the second conversion circuit 80. Meanwhile, the D-FF 82 is reset upon initialization and its output becomes 1.

When the output of the latch-type PUF 20 is constantly 1, the D-FF 82 has been initialized to 1. Therefore, since both the two inputs of the AND circuit 81 are 1, its output becomes 1. Since the output is input to D-FF 82, the output of the D-FF 82 still remains as 1. Therefore, the output of the second conversion circuit 80 in this case becomes 1.

Meanwhile, when the output of the latch-type PUF 20 becomes 0 even for a very short period, the output of the AND circuit 81 becomes 0, and since the output is input to the D-FF 82, the output of the D-FF 82 also becomes 0. After that, even if the latch-type PUF 20 becomes 1, the output of the D-FF 82 is 0, and therefore the output of the AND circuit 81 remains as 0, and 0 is maintained as the output of the D-FF 82. Therefore, in both of the cases in which the output of the latch-type PUF 20 is constantly 0 and the output value of the latch-type PUF 20 is a random number (the output is 0 or 1 and not fixed), the output of the second conversion circuit 80 is 0.

As described above, the second conversion circuit 80 of FIG. 13A outputs, when the output of the latch-type PUF 20 is constantly 0 and constantly 1, its output as its own output, and when the output value of the latch-type PUF 20 is a random number, converts its output value into a prescribed fixed value "0" and outputs it.

Next, the second example in FIG. 13B is explained.

In FIG. 13B, the second conversion circuit 80 is configured including an AND circuit 83, NOT circuits 84 and 86, and a D-FF 85.

To one of the input of the AND circuit 83, the output of the latch-type PUF 20 is input, and to the other input, the output of the NOT circuit 86 is connected. The output of the AND circuit 83 is connected to the input of the NOT circuit 84, and the output of the NOT circuit 84 is connected to the input of the D-FF 85. The output of the D-FF 85 is also connected to the input of the NOT circuit 86. The output of the NOT circuit 86 becomes the output of the second conversion circuit 80. Meanwhile, the D-FF 85 is reset upon initialization and its output becomes 0.

When the output of the latch-type PUF 20 is constantly 1, 1 is constantly input to one of the inputs of the AND circuit 8. In addition, at this time, since the D-FF 85 has been initialized to 0, 1 is also input to the other of the inputs of the AND circuit 83 by the function of the NOT circuit 86. Therefore, at this time, the output of the AND circuit 83 becomes 1, and the output of the NOT circuit 84 becomes 0. Since the output of the NOT circuit 84 is input to the D-FF 75, 0 is maintained as the output of the D-FF 72. Therefore, by the function of the NOT circuit 86, the output of the second conversion circuit 80 becomes 1.

Meanwhile, when the output of the latch-type PUF 20 becomes 0 even for a very short period, since 0 is input to one of the inputs of the AND circuit 83, the output of the AND circuit 83 becomes 0, and the output of the NOT circuit 84 becomes 1. Since the output of the NOT circuit 84 is input to the D-FF 85, the output of D-FF 85 also becomes 1, and the output of the NOT circuit 86 becomes 0. After that, even if the latch-type PUF 20 becomes 1 and 0 is input to one of the inputs of the AND circuit 83, since the input to the other remains 0, the output of the AND circuit 83 is 0 and the output of the NOT circuit 84 remains 1, 1 is maintained as the output of the D-FF 85. Therefore, by the function of the NOT circuit 86, in both of the cases in which the output of the latch-type PUF 20 is constantly 0 and the output value of the latch-type PUF 20 is a random number (the output is 0 or 1 and not fixed), the output of the second conversion circuit 80 is 0.

As described above, the second conversion circuit 80 in FIG. 13B also outputs, when the output of the latch-type PUF 20 is constantly 0 and constantly 1, its output as its own output, and when the output value of the latch-type PUF 20 is a random number, converts its output into a prescribed fixed value "0" and outputs it.

Next, FIG. 14 is explained. FIG. 14 illustrates the third example of the specific circuit configuration of the random number judgment unit 40 and the output conversion unit 60 of the individual-specific information generation apparatus 200 in FIG. 8.

The example in FIG. 14 is configured so that the output conversion unit 60 converts output of the latch-type PUFs 20 that are judged by the random number judgment unit 40 as having a random number output value into a value according to the number representing the order defined in advance in the latch-type PUF 20

The circuit configuration of FIG. 14 is configured so that the output of the latch-type PUF 20 is input to one of the first conversion circuit 70 and the second conversion circuit 80, and its output is input to the individual-specific information generation unit 50.

The first conversion circuit 70 is similar to the one in FIG. 10, and operates to judge whether the output of the latch-type PUF 20 is a random number or fixed, and also to convert the output of the ones that are judged as having a random number output value into a prescribed fixed value "1". Therefore, the one having the circuit configuration illustrated in FIG. 11A and FIG. 11B may be used as the first conversion circuit 70 in FIG. 14.

The second conversion circuit 80 is also similar to the one in FIG. 12, and operates to judge whether the output of the latch-type PUF 20 is a random number or fixed, and also to convert the output of the ones that are judged as having a random number output value into a prescribed fixed value "0". Therefore, the one having the circuit configuration illustrated in FIG. 13A and FIG. 13B may be used as the second conversion circuit 80 in FIG. 14.

In FIG. 14, which one of the first conversion circuit 70 and the second conversion circuit 80 is connected to the latch-type PUF 20 is determined in advance by a number representing the order defined in advance in the latch-type PUF 20. More specifically, the first conversion circuit 70 is connected to the latch-type PUF 20 whose number representing the order defined in advance is an odd number, and the second conversion circuit 80 is connected to the latch-type PUF 20 whose number representing the order defined in advance is an even number. That is, in the configuration in FIG. 14, the output conversion unit 60 sets the output of the latch-type PUF 20 to 1 when the number of order defined in advance in the latch-type PUF 20 judged by the random number judgment unit 40 as having a random number output value is an odd number. Meanwhile, the output conversion unit 60 sets the output of the latch-type PUF 20 to 0 when the number of order defined in advance in the latch-type PUF 20 judged by the random number judgment unit 40 as having a random number output value is an even number.

Meanwhile, the configuration may be also made while replacing the latch-type PUF 20 with the Arbiter PUF 10 in FIG. 1 in the individual-specific information generation apparatus 200 in FIG. 8. FIG. 15, FIG. 16, and FIG. 17 are the ones in which the latch-type PUF 20 in the circuit configurations illustrated in FIG. 10, FIG. 12, and FIG. 14 is replaced with the Arbiter PUF 10, respectively. Thus, when replacing the latch-type PUF 20 with the Arbiter PUF 10, there is no need for changing other circuit configurations and it may be performed easily.

Figure 18:
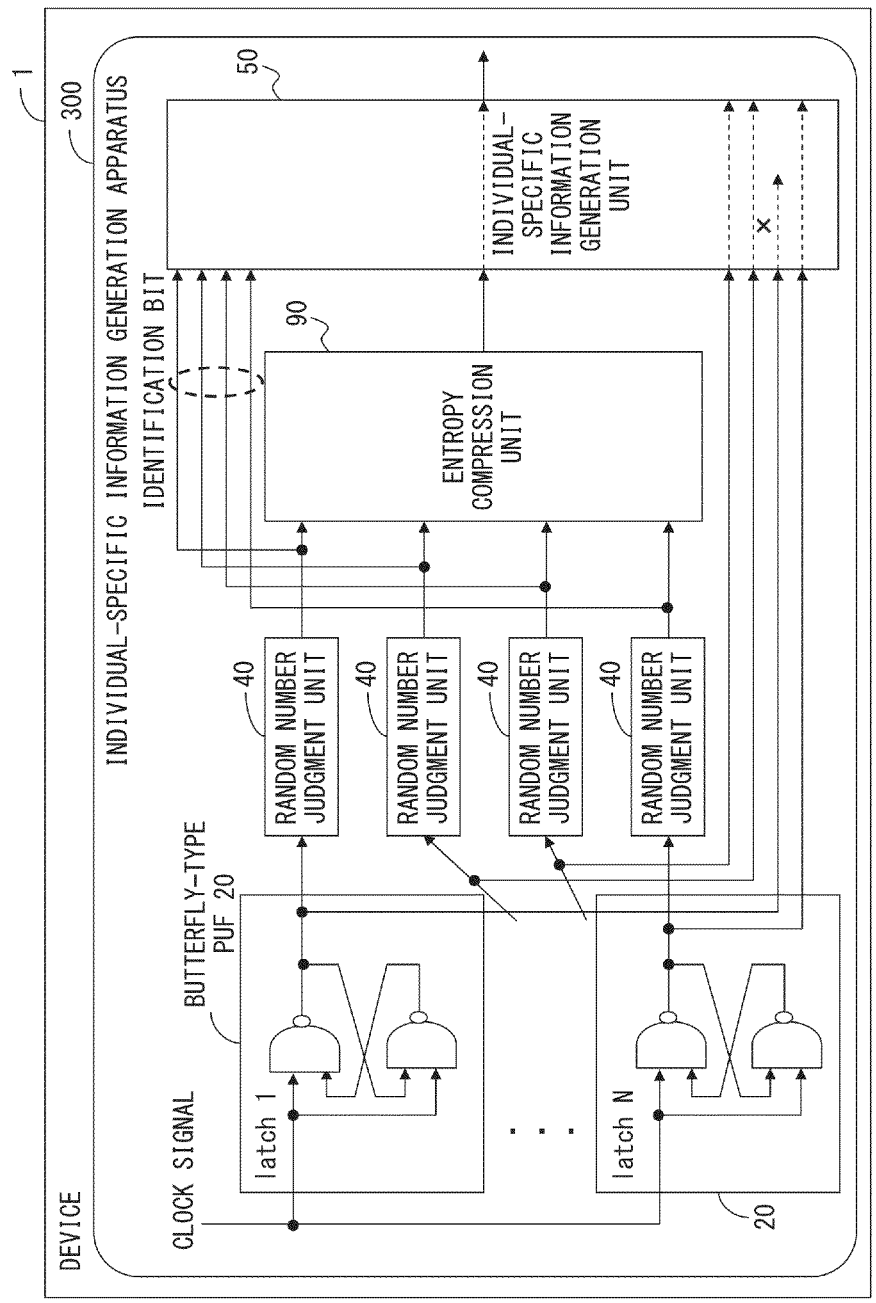
FIG. 18 is a third example of the individual-specific information generation apparatus.

Next, FIG. 18 is explained. FIG. 18 illustrates the third example of the individual-specific information generation apparatus.

The individual-specific information generation apparatus 300 in FIG. 18 is implemented on the device 1 being an electronics device. The individual-specific information generation apparatus 300 has a first configuration in which respective outputs of the latch-type PUFs are input to the random number judgment unit 40 one by one, and its respective outputs are input to the entropy compression unit 90, and the output of the entropy compression unit 90 is input to the individual-specific information generation unit 50. Furthermore, the individual-specific information generation apparatus 300 also includes a configuration in which the individual-specific information generation apparatus 100 in FIG. 5 is combined. More specifically, as a configuration for this, the individual-specific information generation apparatus 300 includes a second configuration in which the individual-specific information generation unit 50 generates individual-specific information of the device 1 by selecting respective outputs of the latch-type PUFs 20 using respective outputs of the random number judgment unit 40.

First, the first configuration mentioned above in the individual-specific information generation apparatus 300 is explained.

As the random number judgment unit 40 in FIG. 18, the one illustrated in FIG. 6 is used. Therefore, the output value of the random number judgment unit 40 is 0 when the latch-type PUF 20 constantly outputs only one of the 0 and 1, and its output value is 0 when the latch-type PUF 20 outputs a random number output value. Thus, the random number judgment unit 40 assigns one of the values 0 of the binary information to the one judged as having a fixed output value among the latch-type PUFs 20, and assigns the other value 1 of the values of the binary information to the one judged as having a random number output value among the latch-type PUFs 20.

Figure 19:
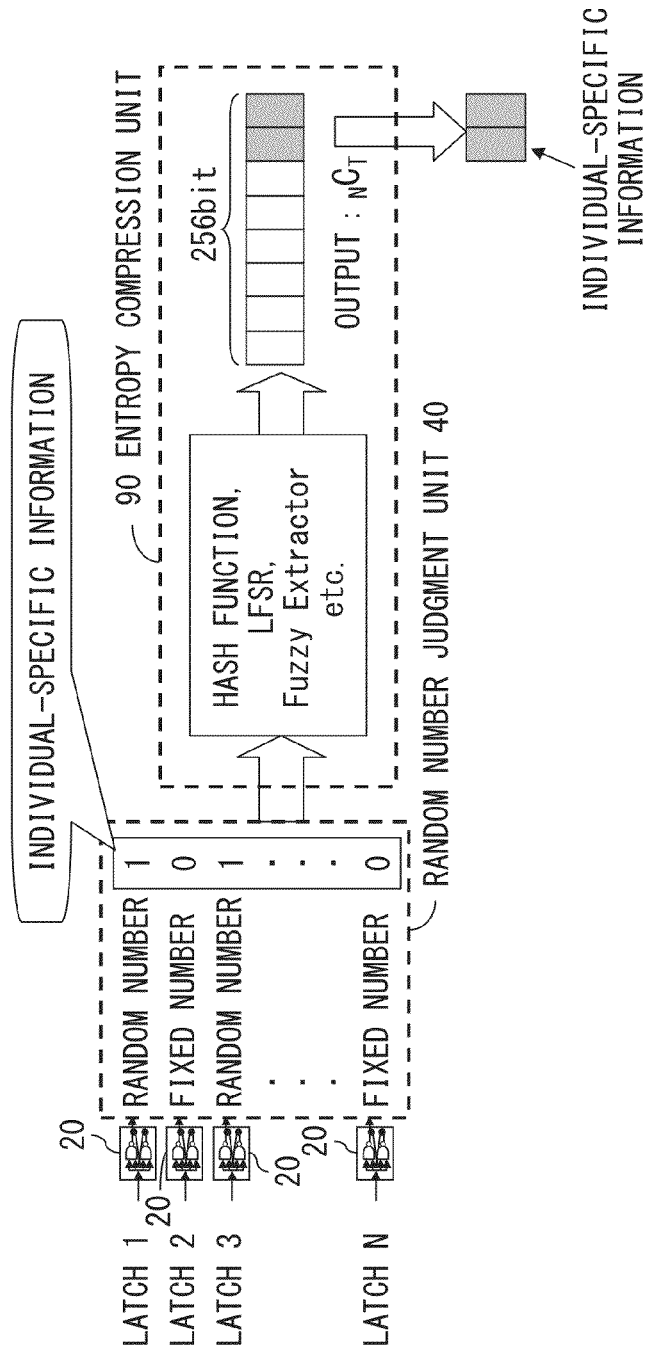
FIG. 19 is a diagram to explain the operation of an entropy compression unit in the individual-specific information generation apparatus in FIG. 18.

The operation of the entropy compression unit 90 is explained using FIG. 19.

First, as a preprocessing, the entropy compression unit 90 generates a bit string by arranging the values assigned by the random number judgment unit 40 to the respective latch-type PUFs 20 according to information of the order defined in advance for the respective latch-type PUFs 20. Next, the entropy compression unit 90 performs entropy compression to the bit string obtained by the arrangement as described above, and outputs the obtained value.

Meanwhile, in this embodiment, a circuit that obtains a hash function value with respect to the obtained bit string is used as the entropy compression unit 90. More specifically, as the circuit, a circuit that obtains a hash function value by SHA-256 being a hash function adopted by the Federal Information Processing Standards/FIPS is used. Therefore, the output of the entropy compression unit 90 becomes a 256-bit bit string.

Meanwhile, as the function to be used for the entropy compression, instead of the hash function, functions such as LFSR (linear feedback shift register) and FUZZY EXTRACTOR may also be used.

Incidentally, assuming the number of the latch-type PUF 20 as N and that T units among them are outputting a random number output value, $_NC_T$ patterns of the bit strings arranged by the entropy compression unit 90 as described earlier are obtained. Therefore, among the 256-bit output value output from the entropy compression unit 90, the entropy of the bits corresponding to the $_NC_T$ bit patterns may be used as individual-specific information. Therefore, the individual-specific information generation unit 50 extracts a bit string corresponding to the $_NC_T$ bit patterns from the output of the entropy compression unit 90, and outputs the obtained bit string as individual-specific information of the device 1.

Meanwhile, the individual-specific information generation unit 50 may also output the 256-bit hash value output from the entropy compression unit 90 described earlier as individual-specific information of the device 1 without change.

In addition, mentioned earlier, the individual-specific information generation apparatus 300 has the configuration of the individual-specific information generation apparatus 100 in FIG. 5 as the second configuration to generate the individual-specific information. Then, the individual-specific information generation unit 50 in FIG. 18 is configured to have the same function as the individual-specific information generation unit 50 in FIG. 5. That is, the configuration is made so that the output of ones that are judged by the random number judgment unit 40 as having a fixed output value among the latch-type PUF 20 are arranged according to information of the order to generate individual-specific information of the device 1. At this time, for the ones that are judged by the random number judgment unit 40 as having a random number output value among the latch-type PUF 20, their output (that is, the random number output value) is discarded and not used for the generation of the individual-specific information. Then, the individual-specific information generation unit 50 may output the one in which the first individual-specific information generated as described earlier and the second individual-specific information described above from the entropy compression unit 90 are arranged as individual-specific information of the device 1.

Assuming the number of the latch-type PUF 20 as N and that T units among them are outputting a random number output value, $2^{N-T}$ patterns of the first individual-specific information mentioned above are obtained. Meanwhile, at this time, $_NC_T$ patterns of the second individual-specific information are obtained as described earlier. Therefore, when the individual-specific information generation unit 50 generates individual-specific information of the device 1 by arranging the first individual-specific information and the second individual-specific information as mentioned earlier, $2^{N-T} \times _NC_T$ patterns of individual-specific information may be obtained.

Figure 20:
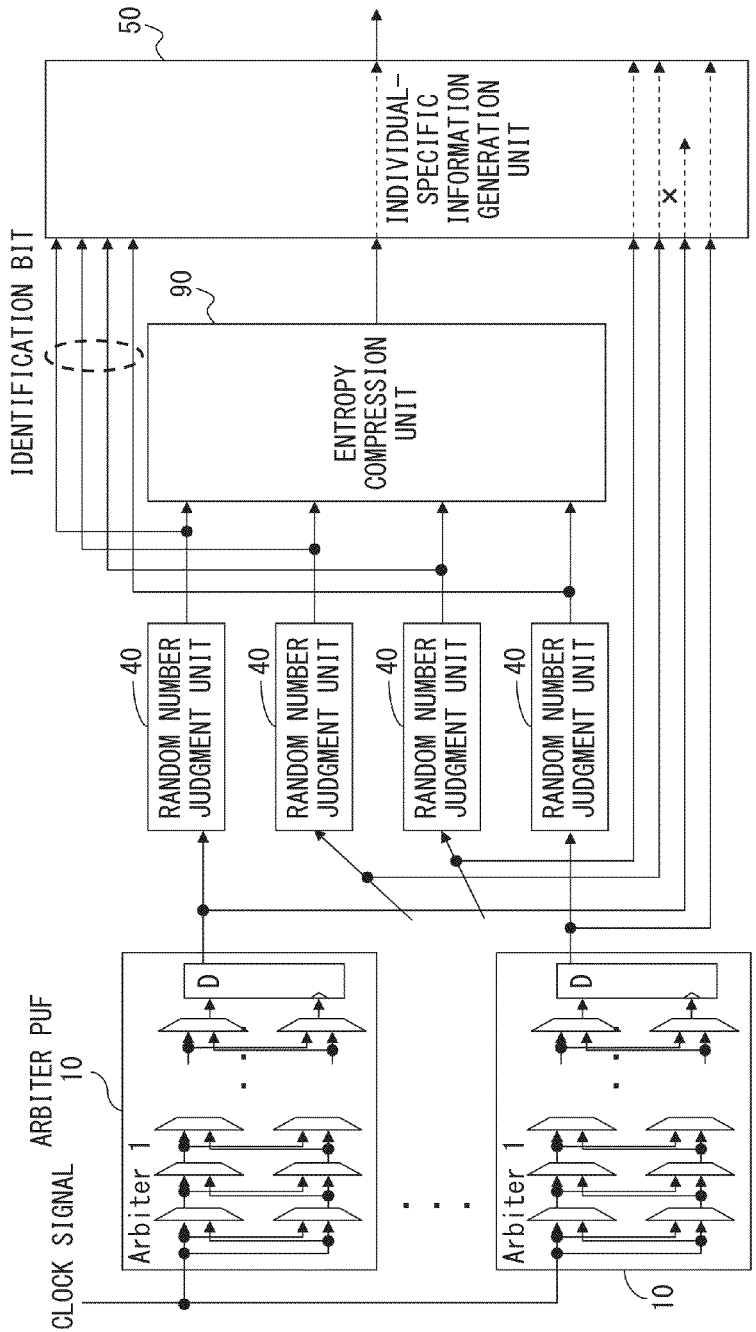
FIG. 20 is a diagram to explain replacement of the latch PUF with the Arbiter PUF in the circuit configuration in FIG. 18.

Meanwhile, in the individual-specific information generation apparatus 300 in FIG. 18, it is also possible to make the configuration while replacing the latch-type PUF 20 with the Arbiter PUF 10 in FIG. 1. FIG. 20 is the one in which the latch-type PUF 20 in the circuit configurations illustrated in each drawing in FIG. 18 is replaced with the Arbiter PUF 10. Thus, when replacing the latch-type PUF 20 with the Arbiter PUF 10, there is no need for changing other circuit configurations and it may be performed easily.

Figure 21:
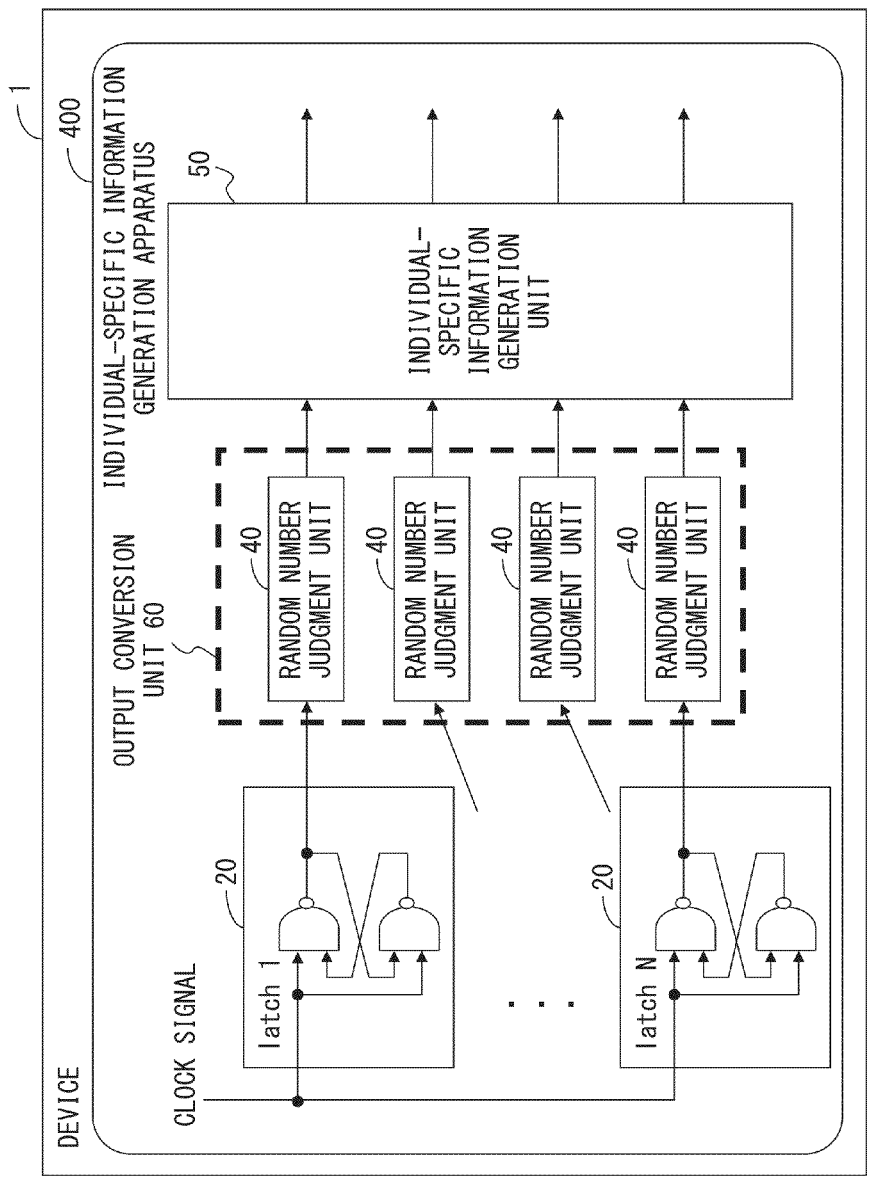
FIG. 21 is a fourth example of an individual-specific information generation apparatus.

Next, FIG. 21 is explained. FIG. 21 illustrates the fourth example of the individual-specific information generation apparatus.

The individual-specific information generation apparatus 400 in FIG. 21 is implemented on the device 1 being an electronics device. The individual-specific information generation apparatus 400 has a configuration in which respective outputs of the latch-type PUFs are input to the random number judgment unit 40 one by one, and its respective outputs are input to the individual-specific information generation unit 50.

Figure 22:
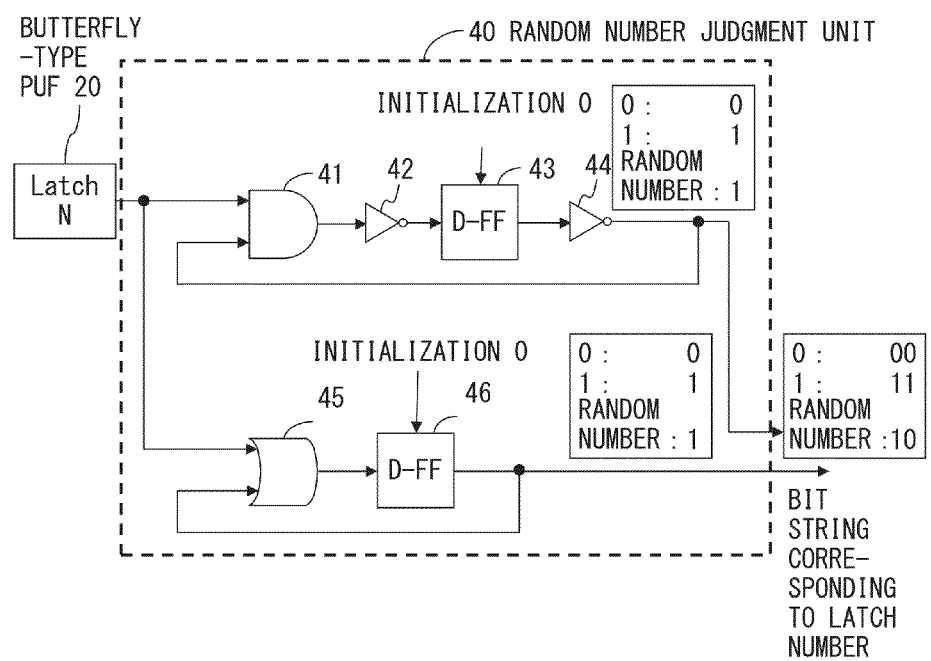
FIG. 22 is a second example of the circuit configuration of the random number judgment unit.

Here, FIG. 22 is explained. FIG. 22 illustrates the second example of the circuit configuration of the random number judgment unit 40. The second example is used for the individual-specific information generation apparatus 400 in FIG. 21.

Comparing the second example of the circuit configuration of the random number judgment unit 40 illustrated in FIG. 22 with the first example in FIG. 6, the difference is that the two inputs to the EXOR circuit 47 in the first example become the output of the random number judgment unit 40 and the EXOR circuit 47 is deleted. Therefore, when the output of the latch-type PUF 20 is constantly 0, the output of the NOT circuit 44 becomes 0, and the output of the D-FF 46 also becomes 0. Meanwhile, when the when the output of the latch-type PUF 20 is constantly 1, the output of the NOT circuit 44 becomes 1, and the output of the D-FF 46 becomes 1. Furthermore, when the output of the latch-type PUF 20 is a random number (the output is 0 or 1 and not fixed), the output of the NOT circuit 44 becomes 0, and the output of the D-FF 43 becomes 1.

The random number judgment unit 40 in FIG. 22 configures a bit string by arranging the bit output by the NOT circuit 44 and the bit output by the D-FF 46 and outputs it. Therefore, the random number judgment unit 40 outputs a bit string "00" when the output of the binary output latch-type PUF 20 is constantly 0, and outputs a bit string "11" when the output of the latch-type PUF 20 is constantly 1. In addition, the latch-type PUF 20 outputs a bit string "10" when the output value of the latch-type PUF 20 is a random number. For example, the random number judgment unit 40 also has a function as the output conversion unit 60. That is, the random number judgment unit 40 converts the output of the ones judged as having a random number output value among the latch-type PUFs 20 into a first bit string "10". In addition, the random number judgment unit 40 also converts the output of the ones judged as having a fixed output value among the latch-type PUFs. By this conversion, when the output is 0, it is converted to a bit string that is different from the first bit string, for example, a second bit string "00", and when the output 1, it is converted into a bit string that is different from both the first bit string and the second bit string, for example, a third bit string "11".

Figure 23:
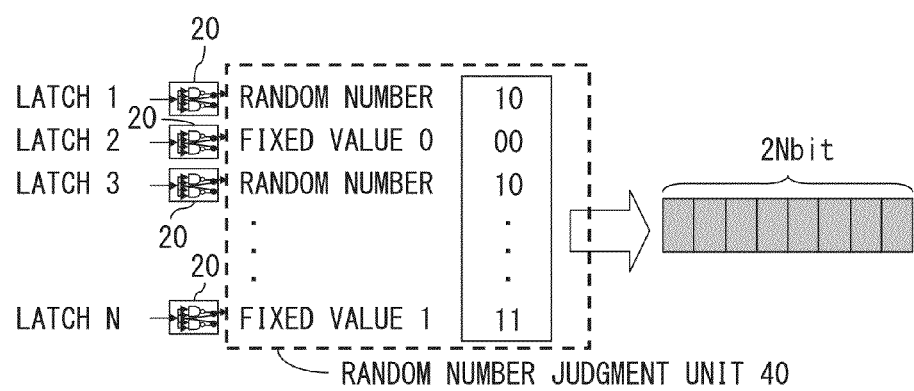
FIG. 23 is a diagram to explain the operation of the individual-specific information generation unit in FIG. 21.

The operation of the individual-specific information generation unit 50 in FIG. 21 is explained using FIG. 23. The individual-specific information generation unit 50 generates individual-specific information of the device 1 by arranging respective outputs of the latch-type PUFs 20 converted into the bit string as described above, according to information of the order defined in each of the latch-type PUF 20. Therefore, when the number of latch-type PUF 20 used for the generation of the individual-specific information is N, 2N-bit individual-specific information is generated.

As described above, the individual-specific information generation apparatus 400 generates individual-specific information of the device 1 by assigning three different values depending on each case of the cases when the output of the latch-type PUF 20 is constantly 0, constantly 1 and a random number output value. Therefore, a large number of patterns may be obtained as individual-specific information.

Meanwhile, in the individual-specific information generation apparatus 400 in FIG. 21, the configuration may be also made while replacing the latch-type PUF 20 with the Arbiter PUF 10 in FIG. 1. FIG. 24 is the one in which the latch-type PUF 20 in the circuit configurations illustrated in each drawing in FIG. 21 is replaced with the Arbiter PUF 10. Thus, when replacing the latch-type PUF 20 with the Arbiter PUF 10, there is no need for changing other circuit configurations and it may be performed easily.

Figure 25:
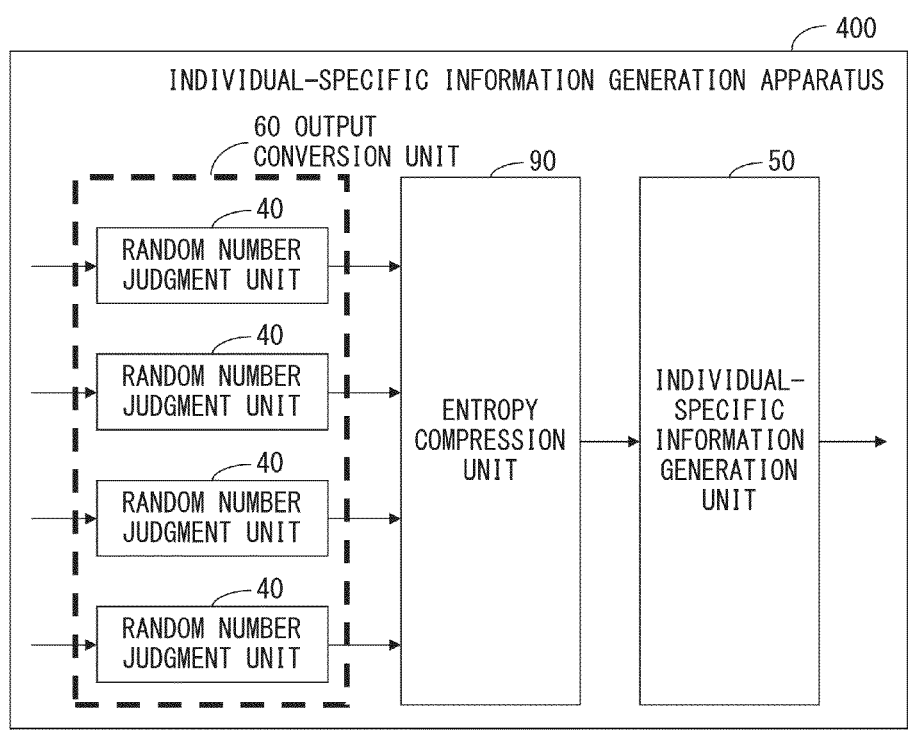
FIG. 25 is a modification example of the individual-specific information generation apparatus in FIG. 21.

In addition, in the individual-specific information generation apparatus 400 in FIG. 21 and FIG. 24, as illustrated in FIG. 25, a similar entropy compression unit 90 to the one in the individual-specific information generation apparatus 300 in FIG. 18 may be added between the random number judgment unit 40 (output conversion unit 60) and the individual-specific information generation unit 50. The entropy compression unit 90 performs entropy compression to a value obtained by arranging respective outputs of the latch-type PUF 20 (or the Arbiter PUF 10) converted into a bit string by the output conversion unit 60 according to the information of the order described earlier. Meanwhile, the individual-specific information generation unit 50 generates, when configured in this way, individual-specific information of the device 1 based on the value obtained by entropy compression by entropy compression unit 90.

Next, an example of a quantitative estimation about the number of patterns of individual-specific information generated by each of the individual-specific information generation apparatuses 30, 100, 200, 300, and 400 described so far is explained.

Meanwhile, here, as a presupposition of the estimation, it is assumed that 128 units of the latch-type PUFs 20 are implemented on the device 1, and T units of the latch-type PUFs 20 among them output a random number output value, and estimation of the number of patterns of individual-specific information about the cases of T=8 and T=32 are performed.

With the individual-specific information generation apparatus 30 in FIG. 4 (however, when including the code error correction circuit), when T=8, there are 120 units of the latch-type PUFs that output a fixed output value, so the number of pattern is $2^{120}$. Meanwhile, when T=32, the number of latch-type PUFs 20 that output a random number output value exceeds about 10, the use as the PUF is impossible.

With the individual-specific information generation apparatus 100 in FIG. 5, when T=8, there are 120 units of the latch-type PUFs that output a fixed output value, and the output of the latch-type PUF 20 that outputs a random number output value is discarded. Therefore, the number of patterns generated by the individual-specific information generation apparatus 100 is $2^{120}$. In addition, when T=32, there are 96 units of the latch-type PUFs that output a fixed output value, and the output of the latch-type PUF 20 that outputs a random number output value is discarded. Therefore, the number of patterns generated by the individual-specific information generation apparatus 100 is $2^{96}$ With the individual-specific information generation apparatus 200 in FIG. 8, individual-specific information is of the device 1 is generated based on information of the order defined in each of the latch-type PUF 20 that is judged by the random number judgment unit 40 as having a random number output value as well. Therefore, in both of the cases of T=8 and T=32, the number of patterns of individual-specific information generated by the individual-specific information generation apparatus 200 is $2^{128}$.

The number of pattern of individual-specific information generated by the individual-specific information generation apparatus 300 in FIG. 18 is, as described earlier, $2^{N-T} \cdot {}_N C_T$, and therefore when T=8, $2^{160}$ patterns, and when T=32, $2^{196}$. In addition, the number of patterns of individual-specific information generated by the individual-specific information generation apparatus 400 in FIG. 21 is the same number of patterns as the individual-specific information generation apparatus 300.

Meanwhile, instead of configuring the individual-specific information generation apparatuses 30, 100, 200, 300, and 400 with hardware, they may be configured with a combination of a processor and software executed by the processor.

Next, an electronics device using the individual-specific information generation apparatuses 100, 200, 300, and 400 illustrated in FIG. 5, FIG. 8, FIG. 18, and FIG. 21 respectively is explained.

First, FIG. 26 is explained. FIG. 26 illustrates a configuration example of the encryption apparatus.

The encryption apparatus 500 is configured using one of the individual-specific information generation apparatuses 100, 200, 300, and 400. Meanwhile, in the following explanation, as an example, a case in which the encryption apparatus 500 uses the individual-specific information generation apparatus 100 in FIG. 5 is explained.

The encryption apparatus 500 is configured including an individual-specific information generation apparatus 100, a CPU 510, a cryptographic processing unit 520, a ROM 530, and a RAM 540. Meanwhile, these constituent elements are all connected to a bus line 550, and are configured to be able to give/receive various data to/from each other under the control by the CPU 510.

The individual-specific information generation apparatus 100 is implemented on the device 1 being an electronic device.

The CPU (Central Processing Unit) 510 is a central processing unit that controls the operations of the respective constituent elements of the encryption apparatus 500.

The cryptographic processing unit 520 performs the encryption processing of various information and the decryption processing of encrypted data. Meanwhile, in this embodiment, the cryptographic processing unit 520 includes a public key coprocessor 521 and a common key coprocessor 522. Here, the public key coprocessor 521 performs encryption and decryption processes using typical public key cryptosystems such as RSA cryptography, elliptic curve cryptography and the like. Meanwhile, the common key coprocessor 522 performs encryption and decryption processes using typical common key cryptosystems such as AES cryptography and the like. Meanwhile, instead of providing the cryptographic processing unit 520 in the encryption apparatus 500, the CPU 510 may be configured to perform the encryption and decryption processes performed by the cryptographic processing unit 520.

The ROM (Read Only Memory) 530 is a non-volatile semiconductor memory that stores a control program executed by the CPU 510 and a unique parameter used by the cryptographic processing unit 520 in encryption and decryption processing in advance. It becomes possible for the CPU 510 to perform operation control of the respective constituent elements of the encryption apparatus 500 when power supply to the encryption apparatus 500 starts, by reading out the control program from the ROM 530 and starting its execution.

The RAM (Random Access Memory) 540 is a volatile semiconductor memory used by the cryptographic processing unit 520 as a work memory area as needed in performing various processing.

In the encryption apparatus 500, the cryptographic processing unit 520 performs the encryption process of information using individual-specific information generated by the individual-specific information generation apparatus 100. In addition, the individual-specific information used by the encryption key in the encryption process is also used for the decryption process performed for encrypted information by the cryptographic processing unit 520.

Meanwhile, in using individual-specific information generated by the individual-specific information generation apparatus 100 for the generation of the encryption key, post processing (Post Processing) to further improve the entropy of the generated individual-specific information may be performed, An example of post processing performed for this purpose is the use of a linear feedback shift register (LFSR). The LFSR is a counter configured with a shift register with feedback by an exclusive OR circuit, which is able to improve the entropy of the individual-specific information. Therefore, by generating the encryption key using the data string output from the LFSR, it becomes possible to generate an encryption key with a higher randomness. Meanwhile, the LFSR may be used by configuring dedicated hardware, and may also be realized by software using the CPU 510.

Next, an authentication system using the individual-specific information generation apparatus 100, 200, 300, or 400 is explained. The authentication system is a system in which an authentication apparatus perform authentication as to whether an authentication target apparatus is a proper one or not.

First, FIG. 27 is explained. FIG. 27 illustrates a configuration example of an authentication target apparatus used for the authentication system.

The authentication target apparatus 600 is configured using one of the individual-specific information generation apparatuses 100, 200, 300, and 400. Meanwhile, in the following explanation, as an example, a case in which the authentication target apparatus 600 uses the individual-specific information generation apparatus 100 in FIG. 5.

The authentication target apparatus 600 is configured including an individual-specific information generation apparatus 100, a CPU 610, a communication unit 620, a ROM 630, and a RAM 640. Meanwhile, these constituent elements are all connected to a bus line 650, and are configured to be able to give/receive various data to/from each other under the control by the CPU 610.

The individual-specific information generation apparatus 100 is implemented on the device 1 being an electronics device, and generates individual-specific information as that of the authentication target apparatus 600.

The CPU 610 is a central processing unit that controls the operations of the respective constituent elements of the authentication target apparatus 600.

The communication unit 620 performs transmission/reception of various data to give/receive various information to/from the authentication apparatus described later.

The ROM 63 is a non-volatile semiconductor memory that stores a control program executed by the CPU 610 in advance. It becomes possible for the CPU 610 to perform operation control of the respective constituent elements of the authentication target apparatus 600 when power supply to the authentication target apparatus 600 starts, by reading out the control program from the ROM 630 and starting its execution.

The RAM 640 is a volatile semiconductor memory used by the CPU 610 as a work memory area as needed in performing various processing.

Figure 28:
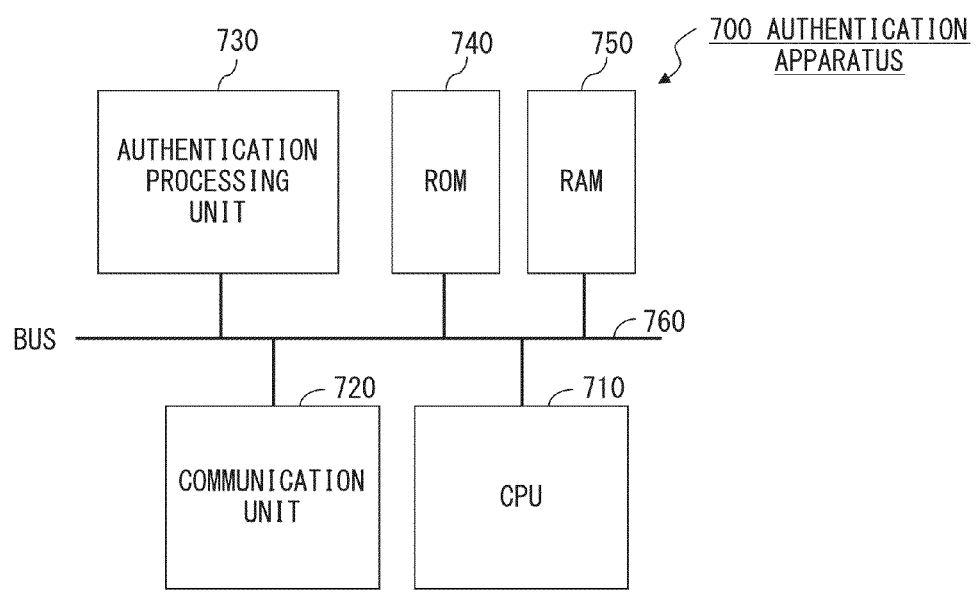
FIG. 28 is a configuration diagram of an authentication apparatus.

Next, FIG. 28 is explained. FIG. 28 illustrates a configuration example of an authentication apparatus used for the authentication system mentioned earlier.

The authentication apparatus 700 is configured including a CPU 710, a communication unit 720, an authentication processing unit 730, a ROM 740, and a RAM 750. Meanwhile, these constituent elements are all connected to a bus line 760, and are configured to be able to give/receive various data to/from each other under the control by the CPU 710.

The CPU 710 is a central processing unit that controls the operations of the respective constituent elements of the authentication apparatus 700.

The communication unit 720 performs communications with the authentication target apparatus 600 in FIG. 27 to give/receive various information.

The authentication processing unit 730 performs an authentication process of the authentication target apparatus 600 as described later. Meanwhile, instead of providing the authentication processing unit 730 in the authentication apparatus 700, the CPU 710 may be configured to perform the authentication process performed by the authentication processing unit 730.

The ROM 740 is a non-volatile semiconductor memory that stores a control program executed by the CPU 710 and individual-specific information about the proper authentication target apparatus 600 used by the authentication process by the authentication processing unit 730 in advance. It becomes possible for the CPU 710 to perform operation control of the respective constituent elements of the authentication apparatus 700 when power supply to the authentication apparatus 700 starts, by reading out the control program from the ROM 740 and starting its execution.

The RAM 750 is a volatile semiconductor memory used by the CPU 710 and the authentication processing unit 730 as a work memory area as needed in performing various processing.

Next, the authentication operation by the authentication system described above is explained.

First, prior to the authentication operation, in the ROM 740 of the authentication apparatus 700, individual-specific information generated by the individual-specific information generation unit 50 in the individual-specific information generation apparatus 100 that the proper authentication target apparatus 600 has is recorded in advance.

When the authentication processing unit 730 of the authentication apparatus 700 starts the authentication process, first, a process is performed to give an instruction to the communication unit 720 and to transmit a transmission request of individual-specific information addressed to the authentication target apparatus 600.

Upon detecting that the communication unit 620 has received the transmission request, in the CPU 610 of the authentication target apparatus 600, a process is performed to give a prescribed instruction to the individual-specific information generation apparatus 100 to make it generate individual-specific information. Next, in the CPU 610, a process is performed to give an instruction to the communication unit 620 to make it transmit the generated individual-specific information addressed to the authentication apparatus 700.

When the communication unit 720 receives the individual-specific information transmitted from the authentication target apparatus 600, the authentication processing unit 730 of the authentication apparatus 700 performs a process to judge whether the individual-specific information matches that of the proper authentication target apparatus 600 recorded in the ROM 740 in advance. Here, when a judgment result that the individual-specific information of the two match is obtained, an authentication result that the authentication target apparatus 600 being the transmission source of the individual-specific information is a proper one is obtained.

Meanwhile, in the authentication process described above, in the ROM 740, a plurality of combinations of relation between the "challenge" and "response" described earlier may be recorded as individual-specific information generated by the individual-specific information generation unit 50 in the individual-specific information generation apparatus 100 that the proper authentication target apparatus 600 has.

In this case, the authentication processing unit 730 of the authentication apparatus 700 attaches information of each "challenge" whose relation with "response" is recorded in ROM 740 to the transmission request of individual-specific information and makes the communication unit 720 transmits it. Meanwhile, the CPU 610 of the authentication target apparatus 600 gives the information of each "challenge" attached to the transmission request to the individual-specific information generation apparatus 100, and makes the individual-specific information generation unit 50 generate information of "response" regarding each "challenge". Then, the CPU 610 performs a process to make the communication unit 620 transmit the generated information of each "response" addressed to the authentication apparatus 700. At this time, the authentication processing unit 730 of the authentication apparatus 700 performs a process to judge whether or not the information of each "response" received at the communication unit 720 all match that of the proper authentication target apparatus 600 recorded in the ROM 740. Here, when a judgment result that the information of "response" of the two all match is obtained, an authentication result that the authentication target apparatus 600 being the transmission source of the "response" is a proper one is obtained. The authentication operation in the authentication system described earlier may also be performed as described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An individual-specific information generation apparatus comprising:
   a plurality of digital circuits in a same circuit configuration, each of the digital circuits configured to output a fixed output value or a random number output value individually without their output with respect to a certain input being determined unambiguously among the digital circuits, and with an order of the respective digital circuits being defined in advance;
   a random number judgment unit configured to judge whether the output value is a random value or fixed, for each of the plurality of digital circuits; and
   an individual-specific information generation unit configured to generate the individual-specific information based on information of the order defined in the digital circuit judged by the random number judgment unit as having a fixed output value among the plurality of digital circuits and the output value.

2. The individual-specific information generation apparatus according to claim 1, wherein
   the individual-specific information generation unit generates the individual-specific information by arranging the output values of the digital circuits judged by the random number judgment unit as having a fixed output value among the plurality of digital circuits according to the information of the order of the digital circuits.

3. The individual-specific information generation apparatus according to claim 1, wherein
   the individual-specific information generation unit generates the individual-specific information, further based on the information of the order defined in each of the digital circuits judged by the random number judgment unit as having a random number output value among the plurality of digital circuits.

4. The individual-specific information generation apparatus according to claim 3, further comprising an output conversion unit configured to convert the output value of the digital circuit judged by the random number judgment unit as having a random number output value among the plurality of digital circuits into a prescribed fixed value, wherein
   the individual-specific information generation unit generates the individual-specific information by arranging the output value of the digital circuit judged by the random number judgment unit as having a fixed output value among the plurality of digital circuits and the prescribed value after conversion of the digital circuit whose output is converted by the output conversion unit among the plurality of digital of digital circuits, according to the information of the order defined in each of the plurality of digital circuits.

5. The individual-specific information generation apparatus according to claim 4, wherein
   the output conversion unit converts the output value of the digital circuit judged by the random number judgment unit as having a random number output value into a value according to a number representing an order defined in the digital circuit.

6. The individual-specific information generation apparatus according to claim 5, wherein
   output values of the plurality of digital circuits are binary values; and
   when the number representing the order defined in the digital circuit judged by the random number judgment unit as having a random number output value is an odd number, the output conversion unit converts an output of the digital circuit into one of the binary values, and when the number representing the order defined in the digital circuit judged by the random number judgment unit as having a random number output value is an even number, the output conversion unit converts an output of the digital circuit into the other of the binary values.

7. The individual-specific information generation apparatus according to claim 4, further comprising an entropy compression unit configured to perform entropy compression to values obtained by arranging respective output values of the plurality of digital circuits converted into bit strings by the output conversion unit, according to the information of the order defined in each of the plurality of digital circuits; and the individual-specific information generation unit generates the individual-specific information based on a value obtained by entropy compression by the entropy compression unit.

8. The individual-specific information generation apparatus according to claim 3, wherein output values of the plurality of digital circuits are binary values; and the random number judgment unit assigns one of binary number information to the digital circuit judged as having a fixed output value among the plurality of digital circuits, and assigns the other of the binary number information to the digital circuit judged as having a random number output value among the plurality of digital circuits; and the individual-specific information generation unit generates the individual-specific information based on a bit string obtained by arranging values as signed by the random number judgment unit to each of the plurality of digital circuits according to information of an order of the digital circuits.

9. The individual-specific information generation apparatus according to claim 8, wherein the individual-specific information generation unit performs entropy compression to the bit string obtained by arranging values assigned by the random number judgment unit to each of the plurality of digital circuits according to information of an order of the digital circuits, and generates the individual-specific information based on the value obtained by the entropy compression.

10. The individual-specific information generation apparatus according to claim 3, wherein output values of the plurality of digital circuits are binary values;

the individual-specific information generation apparatus further comprises an output conversion unit configured to convert the output value of the digital circuit judged by the random number judgment unit as having a random number output among the plurality of digital circuits into a first bit string, and to convert the output value of the digital circuit judged by the random number judgment unit as having a fixed output among the plurality of digital circuits into a second bit string that is different from the first bit string when the output value is one of the values of binary values, and to convert the output value into a third bit string that is different from both the first bit string and the second bit string when the output value is the other of the values of the binary values; and individual-specific information generation unit generates the individual-specific information based on values obtained by arranging respective output values of the plurality of digital circuits converted into bit strings by the output conversion unit, according to the information of the order defined in each of the plurality of digital circuits.

11. The individual-specific information generation apparatus according to claim 1, wherein each of the plurality of digital circuits is a circuit configured so that an edge signal that causes a state change in a D-type flip flop circuit is input into a clock terminal of the D-type flip flop circuit, and also an edge signal having a logically same phase as the edge signal is input into a data input terminal of the D-type flip flop circuit, and a signal output from an output terminal of the D-type flip flop circuit becomes the output.

12. The individual-specific information generation apparatus according to claim 1, wherein each of the plurality of digital circuits is a circuit configured so that an input that causes a metastable condition to an RS latch circuit, and also a signal output from an output terminal of the RS latch circuit becomes the output.

13. An encryption apparatus comprising:

an individual-specific information generation apparatus including a plurality of digital circuits in a same circuit configuration, each of the digital circuits configured to output a fixed output value or a random number output value individually without their output with respect to a certain input being determined unambiguously among the digital circuits, and with an order of the respective digital circuits being defined in advance, a random number judgment unit configured to judge whether the output value is a random value or fixed, for each of the plurality of digital circuits, and an individual-specific information generation unit configured to generate the individual-specific information based on information of the order defined in the digital circuit judged by the random number judgment unit as having a fixed output value among the plurality of digital circuits and the output value; and an encryption processing unit configured to perform encryption processing of information using individual-specific information generated by the individual-specific information generation apparatus as an encryption key.

14. An authentication apparatus for performing authentication as to whether an authentication target apparatus is a proper one or not, the authentication apparatus comprising:

a communication unit configured to perform communication with the authentication target apparatus to give/receive various information;

a recording unit configured to record individual-specific information generated by a individual-specific information generation unit in a individual-specific information generation apparatus provided in a proper authentication target apparatus in advance, the individual-specific information generation apparatus including a plurality of digital circuits in a same circuit configuration, each of the digital circuits configured to output a fixed output value or a random number output value individually without their output with respect to a certain input being determined unambiguously among the digital circuits, and with an order of the respective digital circuits being defined in advance, a random number judgment unit configured to judge whether the output value is a random value or fixed, for each of the plurality of digital circuits, and an individual-specific information generation unit configured to generate the individual-specific information based on information of the order defined in the digital circuit judged by the random number judgment unit as having a fixed output value among the plurality of digital circuits and the output value; and an authentication processing unit configured to perform an authentication process of the authentication target apparatus based on information transmitted from the authentication target apparatus and information recorded in the recording unit;

the communication unit receives individual-specific information transmitted from the authentication target apparatus; and the authentication processing unit performs judgment as to whether or not the individual-specific information received from the authentication target apparatus match the individual-specific information recorded in advance in the recording unit, and obtains an authentication result that the authentication target apparatus is proper one, when it is judged that the two match.

15. A method for generating individual-specific information, the method comprising:

judging whether an output value output from a plurality of digital circuits in a same circuit configuration, each of the digital circuits configured to output a fixed output value or a random number output value individually without their output with respect to a certain input being determined unambiguously among the digital circuits, and with an order of the respective digital circuits being defined in advance is a random number of fixed, for each of the plurality of digital circuits; and generating the individual-specific information based on information of the order defined in the digital circuit judged by the random number judgment unit as having a fixed output value among the plurality of digital circuits and the output value.

16. An authentication method for performing authentication as to whether an authentication target apparatus is a proper one or not, the authentication method comprising:

judging whether or not individual-specific information received from the authentication target apparatus matches individual-specific information generated by a individual-specific information generation unit in a individual-specific information generation apparatus provided in a proper authentication target apparatus being information recorded in advance, the individual-specific information generation apparatus including a plurality of digital circuits in a same circuit configuration, each of the digital circuits configured to output a fixed output value or a random number output value individually without their output with respect to a certain input being determined unambiguously among the digital circuits, and with an order of the respective digital circuits being defined in advance, a random number judgment unit configured to judge whether the output value is a random value or fixed, for each of the plurality of digital circuits, and an individual-specific information generation unit configured to generate the individual-specific information based on information of the order defined in the digital circuit judged by the random number judgment unit as having a fixed output value among the plurality of digital circuits and the output value; and obtaining an authentication result that the authentication target apparatus is a proper one, when a judgment result that the individual-specific information match.

\* \* \* \* \*

UNITED STATES PATENT AND TRADEMARK OFFICE
CERTIFICATE OF CORRECTION

| | | |
|---|---|---|
| PATENT NO. | : 9,021,001 B2 | Page 1 of 1 |
| APPLICATION NO. | : 13/728097 | |
| DATED | : April 28, 2015 | |
| INVENTOR(S) | : Dai Yamamoto et al. | |

It is certified that error appears in the above-identified patent and that said Letters Patent is hereby corrected as shown below:

In the Claims

Column 25, Line 20, In Claim 8, delete "as signed" and insert -- assigned --, therefor.

Signed and Sealed this
Eighth Day of September, 2015

Michelle K. Lee
*Director of the United States Patent and Trademark Office*